(12) United States Patent
Mubarek et al.

(10) Patent No.: US 11,990,032 B2
(45) Date of Patent: May 21, 2024

(54) METHOD, APPARATUS, AND SYSTEM FOR VERIFYING REPORTED RAMP CLOSURES

(71) Applicant: HERE Global B.V., Eindhoven (NL)

(72) Inventors: Omer Mubarek, Chicago, IL (US); Colin Watts-Fitzgerald, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 291 days.

(21) Appl. No.: 17/543,229

(22) Filed: Dec. 6, 2021

(65) Prior Publication Data
US 2023/0177951 A1 Jun. 8, 2023

(51) Int. Cl.
G08G 1/01 (2006.01)
G01C 21/00 (2006.01)

(52) U.S. Cl.
CPC ....... *G08G 1/0133* (2013.01); *G01C 21/3822* (2020.08); *G01C 21/3841* (2020.08); *G08G 1/0112* (2013.01); *G08G 1/0141* (2013.01)

(58) Field of Classification Search
CPC .. G08G 1/0133; G08G 1/0112; G08G 1/0141; G08G 1/096844; G08G 1/096883; G08G 1/096775; G01C 21/3822; G01C 21/3841; G06N 3/0464; G06N 5/046; G06N 20/00
See application file for complete search history.

(56) References Cited

U.S. PATENT DOCUMENTS 6,185,503 B1 * 2/2001 Sumizawa ......... G08G 1/09675 701/428
10,497,256 B1 12/2019 Mubarek
2013/0345955 A1 12/2013 Tashiro et al.
2016/0275787 A1 9/2016 Kesting et al.
2018/0202816 A1 7/2018 Kesting et al.
2020/0111349 A1 4/2020 Mubarek

OTHER PUBLICATIONS

Pietrobon et al., "An Algorithm for Road Closure Detection from Vehicle Probe Data", Research-Article, ACM Trans. Spatial Algorithms Syst. 5, 2, Article 12 (Jul. 2019), 13 pages. https://doi.org/10.1145/332591.
Baier et al., "Mapcorrect: Automatic Correction and Validation of Road Maps Using Public Sensing", Published in Proceedings of the 36th IEEE Conference on Local Computer Networks (LCN 2011), Oct. 2011, pp. 58-66.

* cited by examiner

Primary Examiner — Rodney A Butler
(74) Attorney, Agent, or Firm — DITTHAVONG, STEINER & MLOTKOWSKI

(57) ABSTRACT

An approach is provided for verifying reported ramp closures. The approach involves, for example, processing a ramp closure report to determine reported ramp link(s) associated with the ramp closure report. The approach also involves constructing a ramp network comprising the reported ramp link(s) and other ramp link(s) connected to the reported ramp link(s). The approach further involves collecting probe data collected from one or more sensors of one or more vehicles traveling within the ramp network. The approach further involves identifying one or more driving patterns based on one or more vehicle paths determined from the probe data. The approach further involves performing a verification of a closure status of the reported ramp link(s) based on the one or more driving patterns. The approach further involves providing the verification of the closure status as an output.

20 Claims, 16 Drawing Sheets

CONSTRUCT THE RAMP NETWORK 201

DETERMINE THE SET OF RAMPS TO BE MONITORED 203

INCLUDE NON-RAMP LINKS IN THE RAMP NETWORK 205

CONSTRUCT THE FULL RAMP GRAPH BY ADDING NEIGHBORING RAMP NETWORKS 207

METHOD, APPARATUS, AND SYSTEM FOR VERIFYING REPORTED RAMP CLOSURES

BACKGROUND

Providing data on traffic anomalies or incidents (e.g., abnormalities in traffic that can affect traffic flow such as accidents, lane closures, road closures, etc.) is an important function for mapping service providers. While most traffic anomalies can have at least some negative impact on traffic, road closures can be the most severe because vehicles are unable to travel through the affected roadway. Road closures are published by government/municipality agencies, local police as well as third party semi-official sources. However, obtaining accurate, real-time traffic information regarding ramp closures is particularly challenging, since the reported locations are often inaccurate or ambiguous due to ramp complexity. For instance, for one off-ramp from a highway after a fork, and the ramp closure report does not distinguish which side of the fork is closed. Accordingly, traffic service providers face significant technical challenge to reporting ramp closures accurately.

SOME EXAMPLE EMBODIMENTS

Therefore, there is a need for an approach for verifying a reported ramp closure that are susceptible to location ambiguity.

According to one embodiment, a method comprises processing a ramp closure report to determine one or more reported ramp links associated with the ramp closure report. The method also comprises constructing a ramp network comprising the one or more reported ramp links and one or more other ramp links connected to the one or more reported ramp links. The method further comprises collecting probe data collected from one or more sensors of one or more vehicles traveling within the ramp network. The method further comprises identifying one or more driving patterns based on one or more vehicle paths determined from the probe data. The method further comprises performing a verification of a closure status of the one or more reported ramp links based on the one or more driving patterns. The method further comprises providing the verification of the closure status as an output.

According to another embodiment, an apparatus comprises at least one processor, and at least one memory including computer program code for one or more computer programs, the at least one memory and the computer program code configured to, with the at least one processor, cause, at least in part, the apparatus to process a ramp closure report to determine one or more reported ramp links associated with the ramp closure report. The apparatus is also caused to construct a ramp network comprising the one or more reported ramp links and one or more other ramp links connected to the one or more reported ramp links. The apparatus is further caused to collect probe data collected from one or more sensors of one or more vehicles traveling within the ramp network. The apparatus is further caused to identify one or more driving patterns based on one or more vehicle paths determined from the probe data. The apparatus is further caused to perform a verification of a closure status of the one or more reported ramp links based on the one or more driving patterns. The apparatus is further caused to provide the verification of the closure status as an output.

According to another embodiment, a non-transitory computer-readable storage medium carries one or more sequences of one or more instructions which, when executed by one or more processors, cause, at least in part, an apparatus to process a ramp closure report to determine one or more reported ramp links associated with the ramp closure report. The apparatus is also caused to construct a ramp network comprising the one or more reported ramp links and one or more other ramp links connected to the one or more reported ramp links. The apparatus is further caused to collect probe data collected from one or more sensors of one or more vehicles traveling within the ramp network. The apparatus is further caused to identify one or more driving patterns based on one or more vehicle paths determined from the probe data. The apparatus is further caused to perform a verification of a closure status of the one or more reported ramp links based on the one or more driving patterns. The apparatus is further caused to provide the verification of the closure status as an output.

According to another embodiment, a computer program product may be provided. For example, a computer program product comprising instructions which, when the program is executed by a computer, cause the computer to process a ramp closure report to determine one or more reported ramp links associated with the ramp closure report. The computer is also caused to construct a ramp network comprising the one or more reported ramp links and one or more other ramp links connected to the one or more reported ramp links. The computer is further caused to collect probe data collected from one or more sensors of one or more vehicles traveling within the ramp network. The computer is further caused to identify one or more driving patterns based on one or more vehicle paths determined from the probe data. The computer is further caused to perform a verification of a closure status of the one or more reported ramp links based on the one or more driving patterns. The computer is further caused to provide the verification of the closure status as an output.

According to another embodiment, an apparatus comprises means for processing a ramp closure report to determine one or more reported ramp links associated with the ramp closure report. The apparatus also comprises means for constructing a ramp network comprising the one or more reported ramp links and one or more other ramp links connected to the one or more reported ramp links. The apparatus further comprises means for collecting probe data collected from one or more sensors of one or more vehicles traveling within the ramp network. The apparatus also comprises means for identifying one or more driving patterns based on one or more vehicle paths determined from the probe data. The apparatus also comprises means for performing a verification of a closure status of the one or more reported ramp links based on the one or more driving patterns. The apparatus also comprises means for providing the verification of the closure status as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for verifying reported ramp closures are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
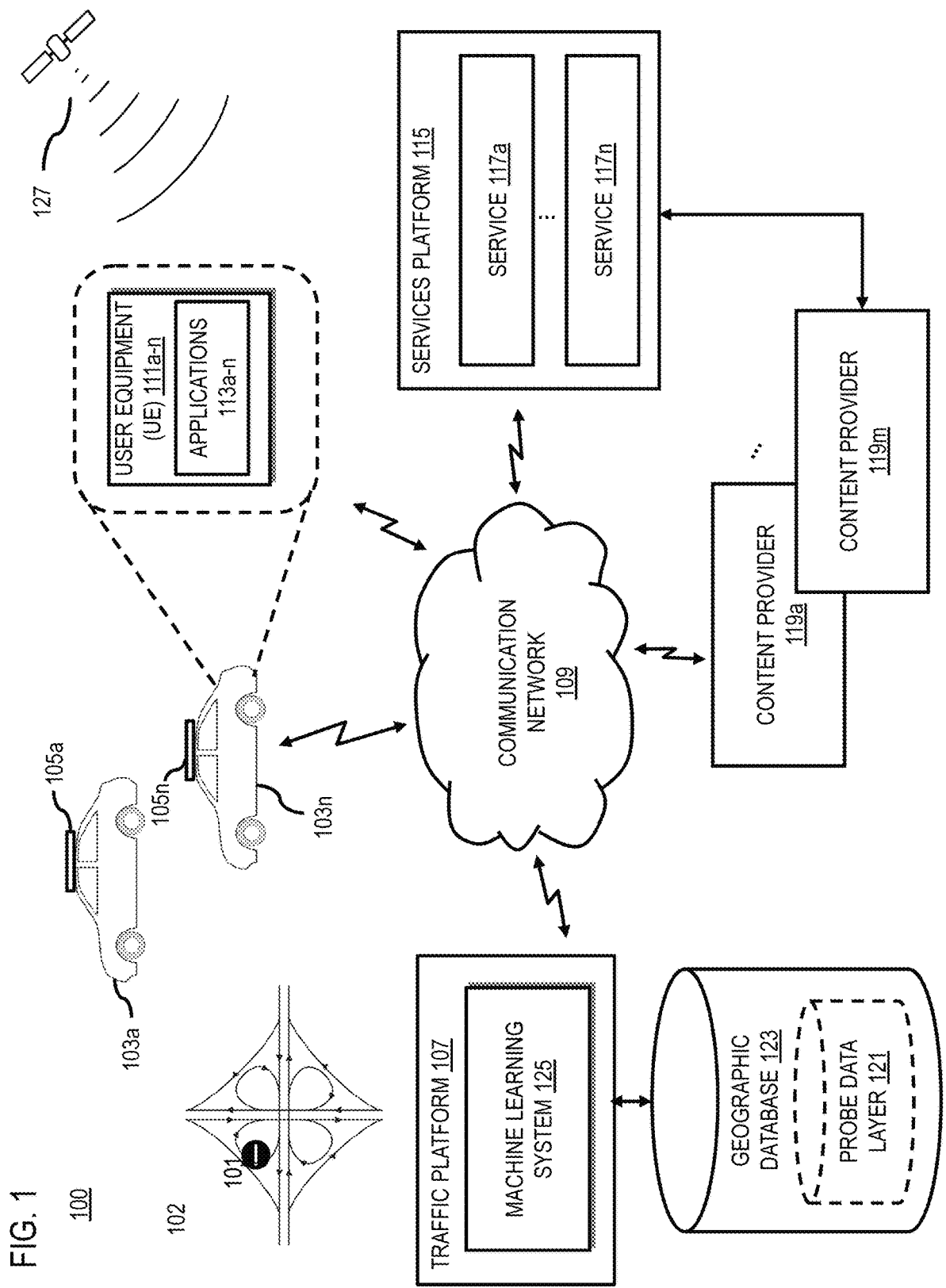
FIG. 1 is a diagram of a system capable of verifying reported ramp closures, according to one embodiment.

FIG. 1 is a diagram of a system 100 capable of verifying a reported ramp closure (e.g., a ramp closure 101 in an interchange 102), according to one embodiment. As mentioned above, providing data on traffic anomalies or incidents (e.g., abnormalities in traffic that can affect traffic flow such as accidents, lane closures, road closures, etc.) is an important function for mapping service providers. While most traffic anomalies can have at least some negative impact on traffic, road closures can be the most severe because vehicles are unable to travel through the affected roadway. Real-time road closure information can provide the drivers the most up-to-date pre-warning of road closure and re-routing accordingly.

As mentioned, road closures can be published by government/municipality agencies, local police, as well as third party semi-official sources. A traffic provider can listen to these feeds, extract the affected roadways, and display the closure locations on a digital map. Then the traffic provider waits for another message indicating that the road has opened. This type of incident reporting is referred to as "journalistic reporting". Journalistic incident reports can be coupled with vehicle GPS probe information, to discover driving patterns from vehicle probes around a reported closure, and verify the road closures. Then again the probe data can be used to monitor the road closures and flag as reopened if the driving patterns change (i.e., vehicles drive through previously closed roadways). Alternatively, monitoring probe activities on all roads can detect road closures in the absence of journalistic reports. These automatic road closure verification and detection methods (e.g., using probe data) can calculate a closure likelihood score for a road segment, and, to either close open roads, open closed roads, or do not take an action based on such score.

Figure 2A:
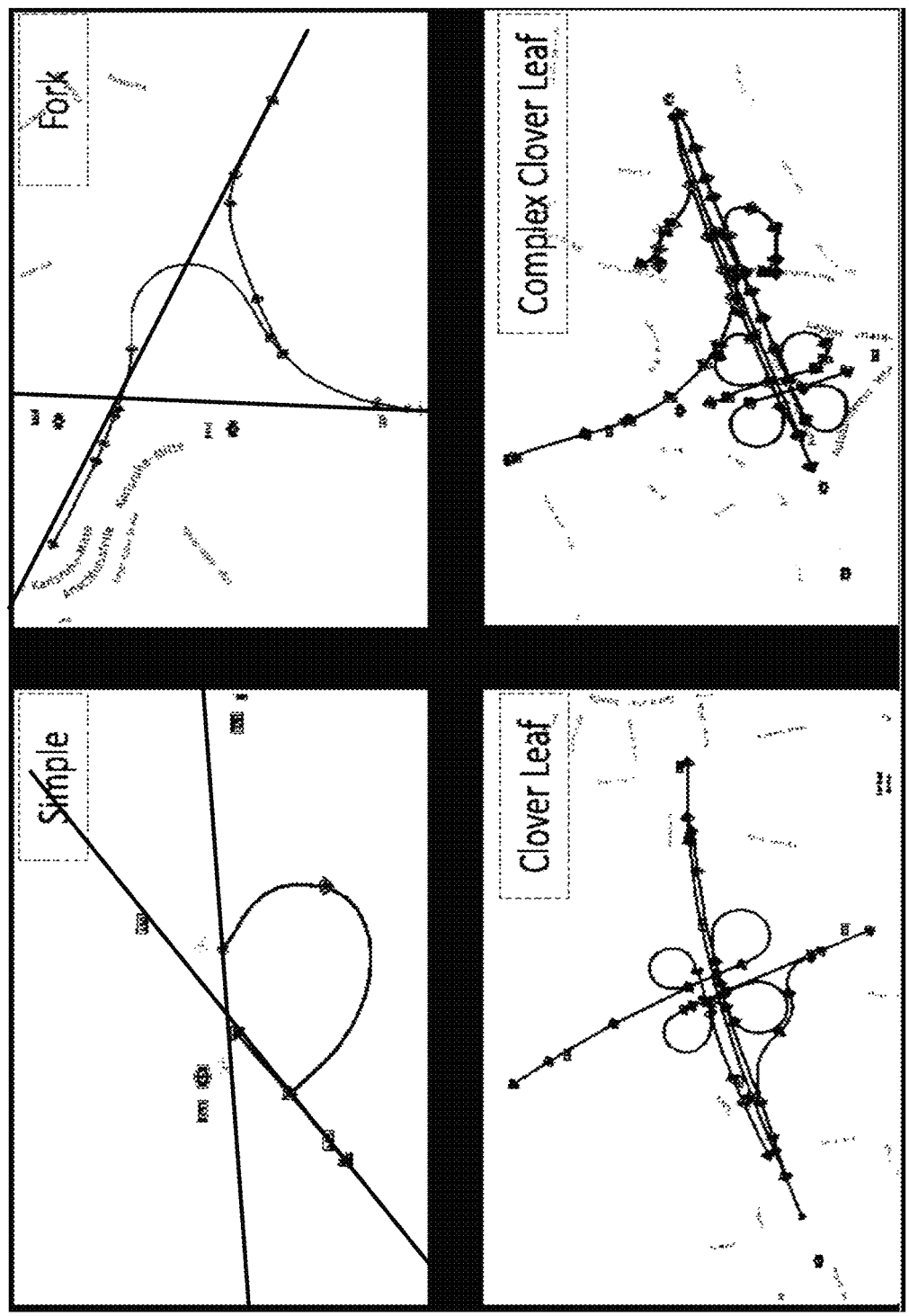
FIG. 2A are diagrams illustrating example ramp networks with increasing complexity, according to various embodiments.

However, certain road topologies with nearby paths, such as a ramp, incur inaccurate or ambiguous locations reported in journalistic event reporting. Such ambiguity varies from provider to provider and depends on ramp complexity. FIG. 2A are diagrams illustrating example ramp networks with increasing complexity (e.g., simple, fork, clover leaf, complex clover leaf), according to various embodiments. A ramp network structure is different from an arterial or a highway. While the road network for an arterial/highway is a long path with connected roads (or ramps) to this path, a ramp network is a complex graph, for example, with a road segment in an West-to-East highway off-ramp being connected to another road segment that is part of a South-to-North highway on-ramp as the simple ramp network depicted in FIG. 2A.

This ramp complexity combined with ambiguous locations reported by a journalistic provider makes it very challenging to determine the exact ramp closure location within a ramp network. As mentioned, for one off-ramp from a highway after a fork, and the ramp closure report does not distinguish which side of the fork is closed (or both). As another instance, an off-ramp functions like a collector road that has its own off ramps, and connect to different roads. Nevertheless, the traffic data provider does not distinguish which specific section of the off-ramp is closed (or all). As yet another instance, the traffic data provider reports a closure on a ramp that connects to West-bound direction of a highway, without specifying whether the off-ramp or on-ramp in that direction is closed (or both). In addition, in terms of journalistic incidents on any type of road, the start and end times of a traffic incident (e.g., a ramp closure) are not always accurate, and schedule changes are not updated on time.

To address these problems, the system 100 of FIG. 1 introduces a capability to automatically verify a reported road closure by isolating the reported ramp segments and building a connected ramp graph around them, monitoring the probe data and/or sensor data received on the ramp segments within this connected ramp graph, building vehicle paths for each vehicle associated with observed data, identifying driving patterns from these vehicle paths, and finally evaluating the ramp segments for ramp closure(s). The output of the evaluation for each ramp segment can be whether they are closed or not. Due to the ambiguity, it is crucial for the system 100 to construct a large enough ramp graph, which spans over multiple ramps in the same ramp network and monitor them.

In another embodiment, the system 100 can accurately report the start and end of a ramp closure in terms of time and space during the lifetime of the ramp closure incident. In another embodiment, the system 100 can detect a degree of ambiguity (e.g., as the scenarios depicted in FIGS. 3A-3E) in a reported ramp closure location and monitor all potentially closed ramps.

Figure 2B:
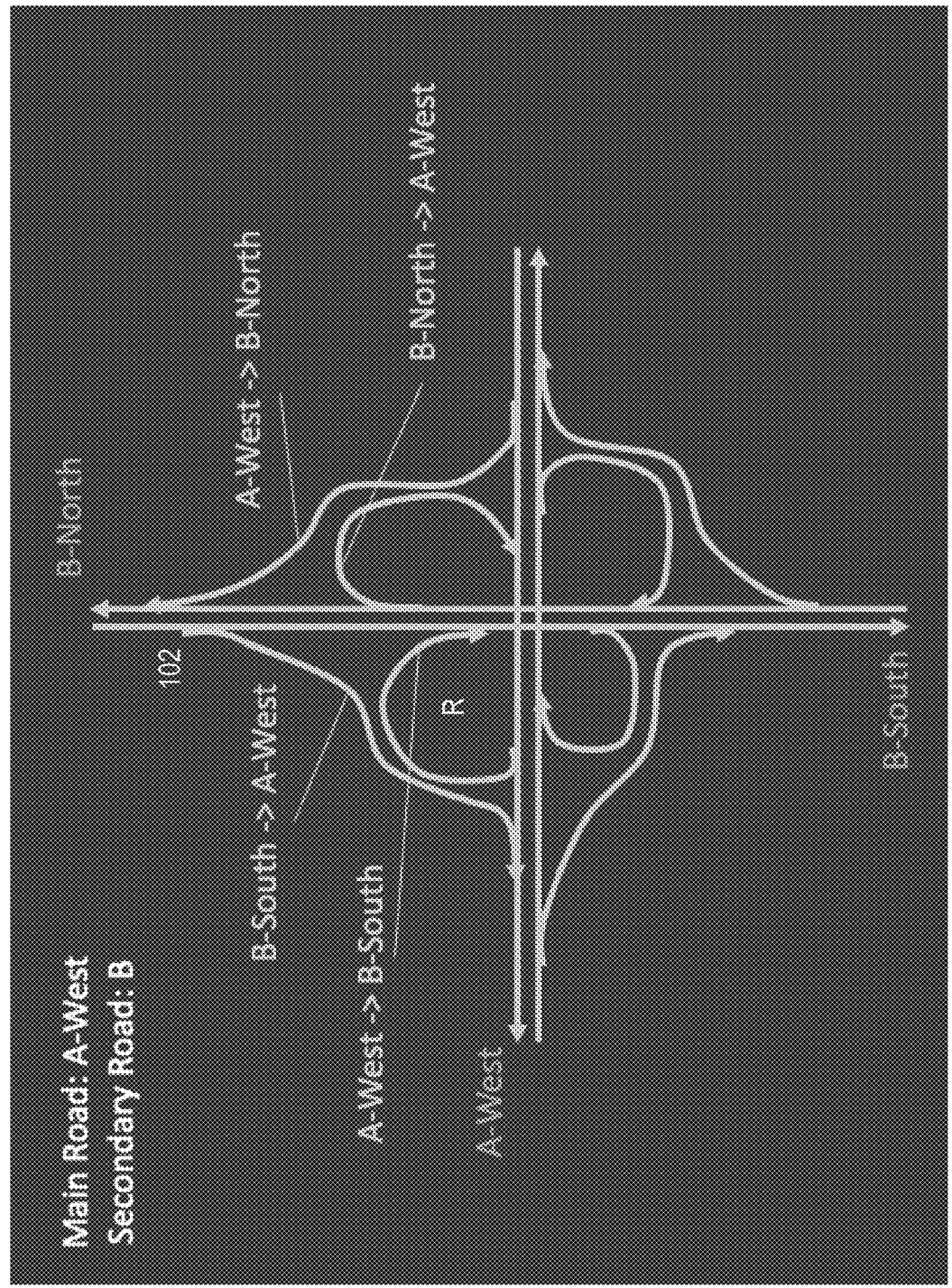
FIG. 2B is a diagram illustrating a clover-leaf interchange, according to one embodiment.
Figure 2C:
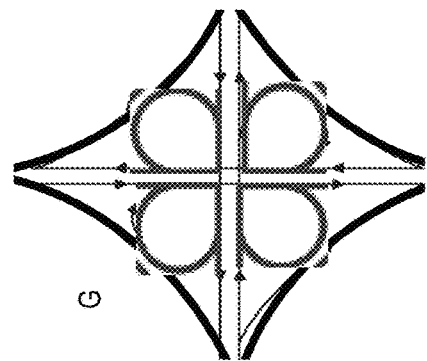
FIG. 2C is a full ramp graph constructing process, according to one embodiment.
Figure 2C:
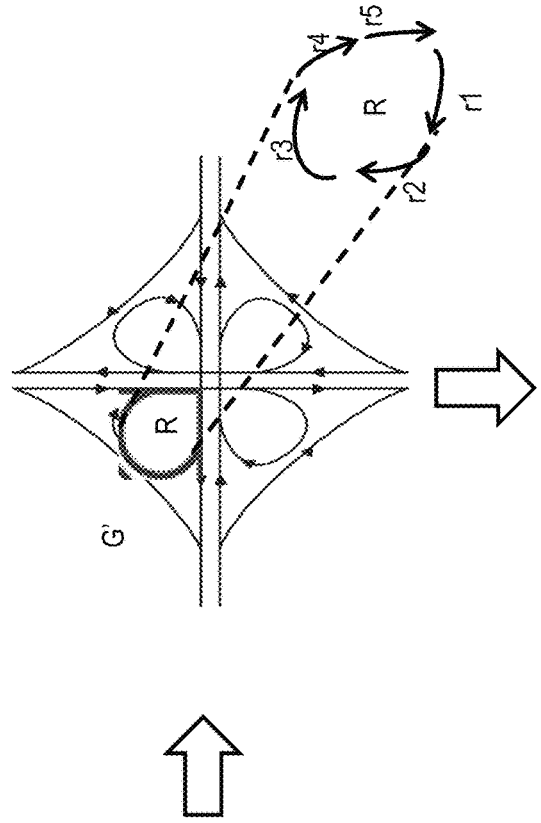
Figure 2C:
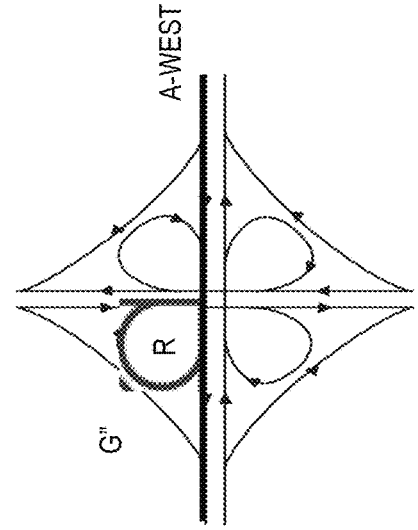
Figure 2C:
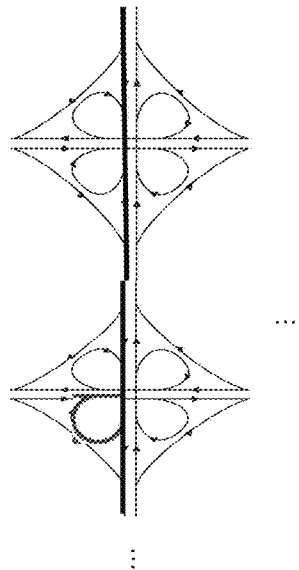

FIG. 2B is a diagram illustrating a clover-leaf interchange (e.g., the interchange 102), according to one embodiment. FIG. 2B is now used as one example for the system 100 to apply a full ramp graph constructing process. FIG. 2C is a full ramp graph constructing process, according to one embodiment. The system 100 can automatically monitor a given set of ramp segments based on use such full ramp graph, identify driving patterns around the monitored ramp segments, compare the monitored driving patterns with known driving patterns (attributes/features) to determine whether the monitored ramp segments are open or closed to traffic.

In FIG. 2B, the ramp network G has multiple ramps connecting Roads A and B in all possible direction combinations. For instance, the ramp network G includes four on-ramps and four off-ramps in bold, while excluding non-ramp segments of the Roads A and B.

In one embodiment, the system 100 can take one road with its direction as the main road (e.g., A-West rather than A only). The other road, which is part of the ramp, is the secondary road (e.g. road B including both directions: B-South and B-North). In this case, for the main road A, the system 100 can use one specific direction (e.g., West), since incident reports are usually specific enough to report one direction. The same approach is applicable to scenarios where traffic reports do not describe a specific road direction, in which case the main road would become A (rather than A-West or A-East). The system 100 can include both directions of the secondary road B, since the main road (e.g., A-West) connects to both directions of the secondary road B. A ramp closure report may indicate a closure location on an exact off-ramp of A-West, an exact on-ramp of road B, an ambiguous off-ramp of road A-West, an ambiguous of road A-West, or just an ambiguous ramp connecting roads A-West and B. FIGS. 3A-3E are diagrams illustrating examples ramp networks of different degrees of ambiguity, according to various embodiments.

With such information, in one embodiment, the system 100 can construct a ramp network (including the reported ramp) in step 201, determine which ramps in the ramp network shall be monitored in step 203, grow the ramp network to include non-ramp links going into/coming out of the ramp network in step 205, and construct a full ramp graph by adding neighboring ramp networks in step 207 based on the process depicted in FIG. 2C.

In step 201 of FIG. 2C, the system 100 can take the links of the reported ramp's location and convert them to a superlink/ramp graph. This is a fully connected, ramp-only graph of superlinks. It corresponds to a ramp network—a collection of ramps that are connected to each other via other ramp links (e.g., the ramp network). As such, the constructed ramp network contains the reported ramp(s) and more to account for ambiguities in the reported ramp location. For instance, the originally reported ramp links might cover an entire ramp (e.g. A-West→B-South), only parts of it (e.g., 3 out of 5 links that make up A-West→B-South). In either case, the system 100 can choose a main road with a direction (i.e., A-West in FIG. 2B), and then grow the ramp network to cover all ramps between A-West and either direction of B (e.g., all ramps connecting A-West to B-South/North).

In one embodiment, given a set of ramp segments/links, the system 100 can construct an initial graph G by connecting the links. By way of example, the system 100 can determine a set of start links S and a set of end links K of the initial graph G. The start links can be those ramp links without incoming connections, while the end links can be those ramp links without outgoing connections. The end links can be the leaf nodes of the initial graph G. For each start link "s" in the start link set S, the system 100 can recursively grow the link graph backwards and forwards from s, until meeting one or more stopping criteria. For each end link "k" in the end link set K, the system 100 can recursively grow the graph backwards and forwards from k, until meeting one or more stopping criteria. The stopping criteria can be: a current link is not a ramp link, no new links are connected to the link at issue, etc. The system 100 then can convert all links to superlinks to provide a ramp network (e.g., within the interchange 102).

In step 203 of FIG. 2C, given the ramp network provided in step 201, the system 100 can determine which ramps should be monitored, depending on which ramp(s) are reported with closure(s) and how ambiguously the closure(s) are reported. A ramp can be represented by one or more ramp links. A ramp link is the unit representation of a ramp segment on a map. A closure link graph can be used to seal the reported ramp closure R and monitor traffic around and through the ramp closure. For instance, the reported ramp closure R includes a connected set of ramp links r1-r5. As part of link graph building, the system 100 can sequence and aggregate ramp links r1-r5 and their probes where it makes sense using a superlink algorithm. A superlink consists of ordered ramp links such that if a vehicle drives through one of the ramp links, it is guaranteed to drive through the other links of the same superlink/ramp as well. Links and superlinks can be used interchangeably, since superlinks merely combine links to save on processing, i.e., an optimization to reduce computer resources usages.

Figure 3B:
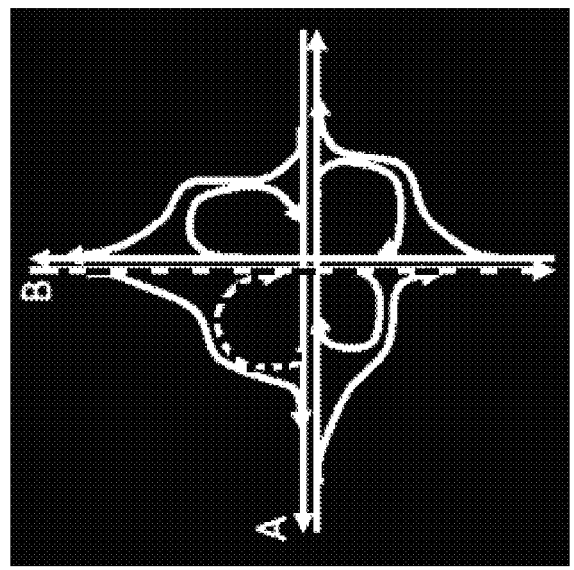
FIGS. 3A-3E are diagrams illustrating examples ramp networks of different degrees of ambiguity, according to various embodiments.
Figure 3A:
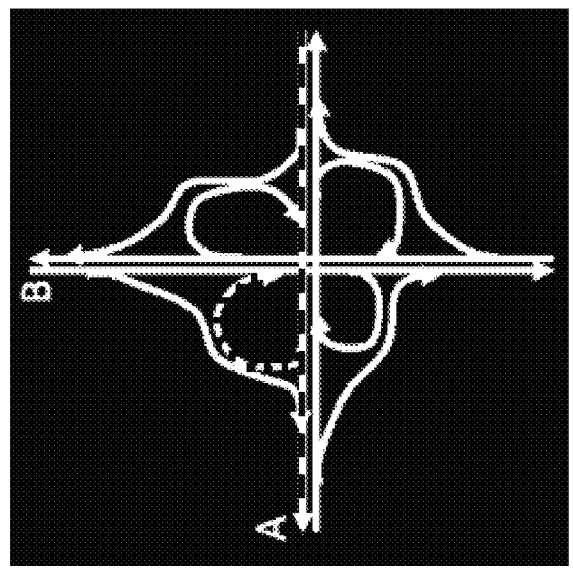

For instance, the system 100 can map reporting ambiguity to which ramps shall be monitored as follows. For an exact on-ramp or an exact off-ramp in broken lines, e.g., A-West→B-South in FIG. 3A, the exact ramp is known, so the system 100 can monitor this specific ramp. In this scenario, there is no ambiguity on the location of the ramp closure, since the traffic data provider has reported the exact off-ramp of A as from A-West to B-South. The reported ramp is shown in FIG. 3A. Note that, this ramp is an on-ramp from Road B's perspective. Similar to FIG. 3A, an exact on-ramp of Road B (e.g., an exact on-ramp to road B in broken lines in FIG. 3B) as from A-West to B-South, has no ambiguity on the location of the ramp closure.

Sometimes, the traffic data provider reports an off-ramp in a ramp network as closed. However, if there are multiple off-ramps in that ramp network, it is ambiguous as to which ramp or ramps are marked as closed. For example, a report causing such ambiguity would state off-ramp of road A-West connecting Road A with Road B, omitting which directions from each road are connected. For such an ambiguous off-ramp, e.g., an off-ramp of A-West connecting Roads A and B in broken lines in FIG. 3C, the system 100 can monitor all off-ramps in the ramp network separately (e.g., A-West→) B-South and A-West→B-North). There is no need to monitor any on-ramps in the ramp network.

Figure 3D:
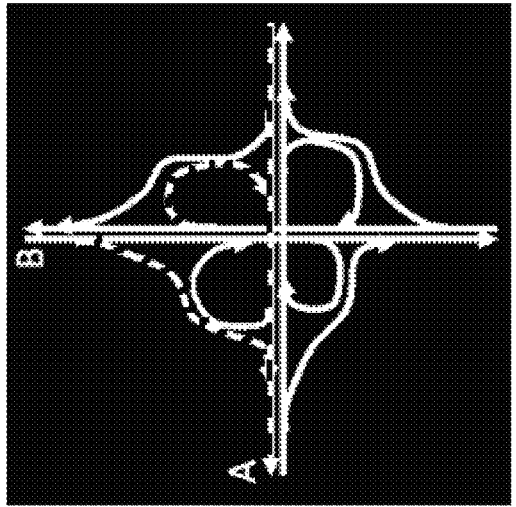
Figure 3C:
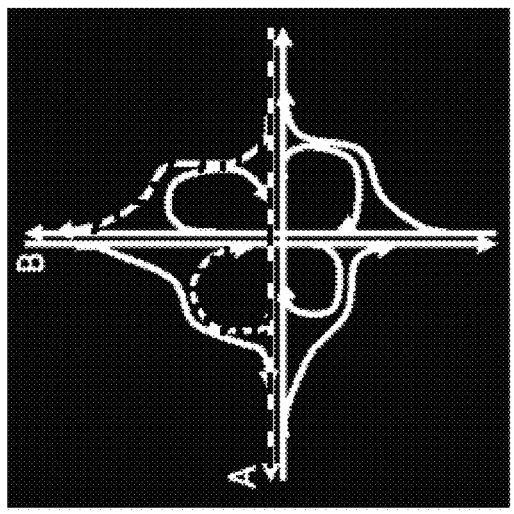

A similar ambiguity to the above scenario in FIG. 3C comes up in on-ramp reporting. In FIG. 3D, road A-West is connected to two on-ramps. When a traffic data provider reports a closure on an on-ramp but does not specify which one, it creates an ambiguous closure report. For example, the report simply states an on-ramp of road A-West connecting roads A and B. For such ambiguous on-ramp, e.g., an on-ramp of B-South connecting Roads A and B, the system 100 can monitor all on-ramps in the road network separately (e.g., B-South→A-West and B-North→A-West in broken lines in FIG. 3D). There is no need to monitor any off-ramps in the ramp network.

Figure 3E:
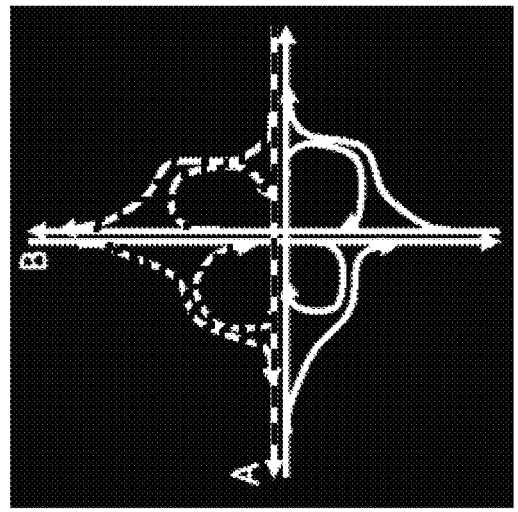

In an extreme case, the traffic data provider reports that a ramp in a ramp network is closed. As illustrated in FIG. 3E, this ramp network has four ramps (2 off-ramps from Road A-West and two on-ramps onto Road A-West). A report stating a ramp connecting Roads A and B would cause this ambiguity by omitting a ramp type (on/off ramp) as well as directions of connected roads. For such ambiguous ramp, e.g., a ramp connecting A-West to Road B in broken limes in FIG. 3E, the system 100 can monitor all ramps connected to A-West in the road network separately (e.g., A-West→B-South, A-West→B-North, B-South→A-West, and B-North→A-West).

In step 205 of FIG. 2C, the system 100 can include non-ramp links in the ramp network. For instance, the ramp graph G" includes the on-ramp R from A-West to B-South and non-ramp segments of A-West.

After determining the specific ramp(s) to be monitored in step 203, the system 100 can enrich these ramps with non-ramp superlinks that are connected to the monitored ramps. For instance, the monitored ramps can be a subset of the ramp network constructed in step 201.

Figure 4A:
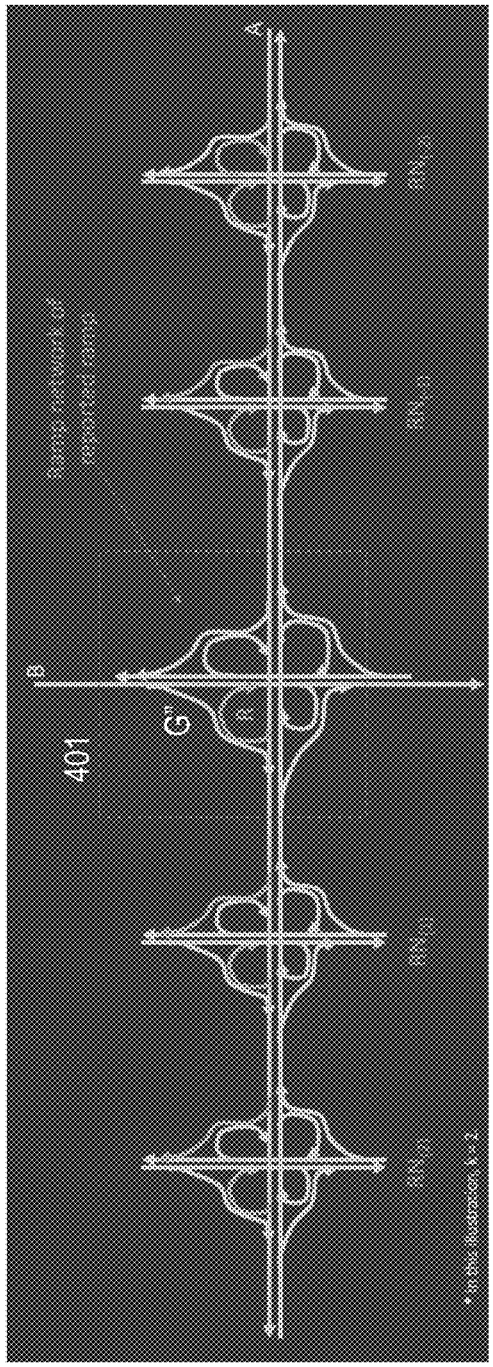
FIGS. 4A-4C are diagrams illustrating examples ramp graphs, according to various embodiments.
Figure 4B:
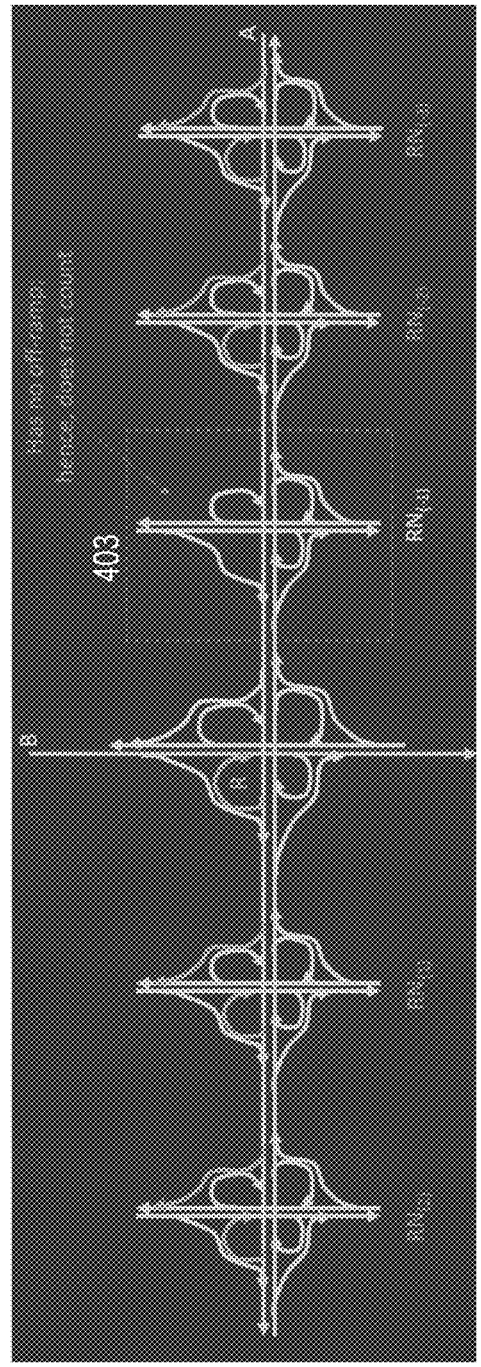
Figure 4C:
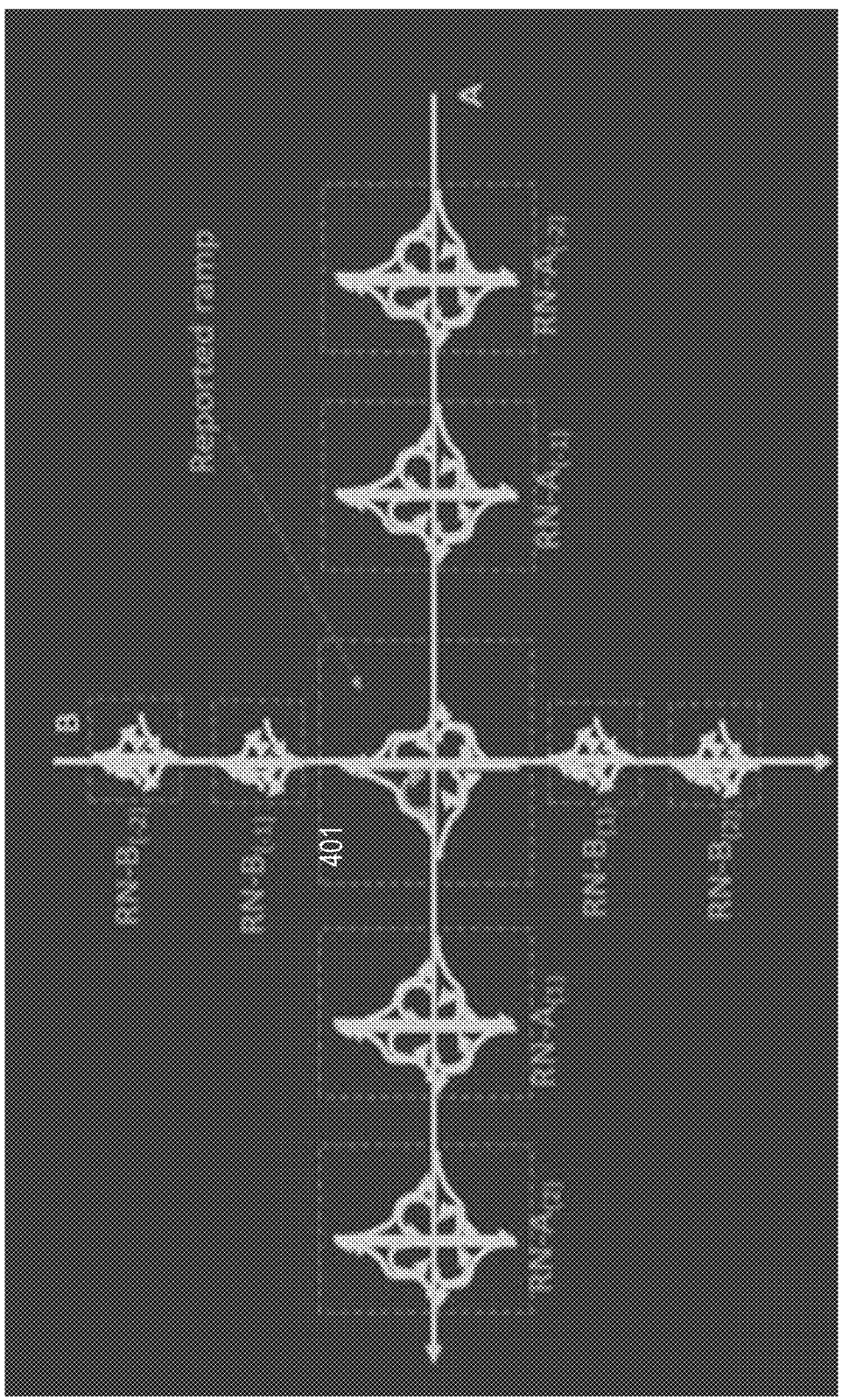

In one embodiment, the system 100 can add non-ramp links by determining, for instance, the trimmed ramp graph G' includes an on-ramp R from A-West to B-South. Again, the start link set S' can be those ramp links without incoming connections, while the end link set K' can be those ramp links without outgoing connections. The end link set K' can be the leaf nodes of the trimmed ramp graph G'. For each start link "s'" in the start link set S', the system 100 can recursively grow the link graph backwards and forwards from s' by adding only non-ramp superlinks, until meeting one or more stopping criteria. For each end link "k'" in the end link set K', the system 100 can recursively grow the graph backwards and forwards from k' by adding only non-ramp superlinks, until meeting one or more stopping criteria. The stopping criteria at a branch can be: (1) the branch extended for a maximum distance, (2) the branch extended for a maximum number of superlinks, (3) the branch extended for a maximum connection complexity, which can be expressed a branch depth and/or a branch breadth (e.g., a combination of a branch depth and a branch breadth). Such stopping criteria for a branch can vary depending on various road attributes, e.g., road type (arterial vs. highway superlink), how busy the road is, etc. In step 207 of FIG. 2C, the system 100 can construct a full ramp graph by adding neighboring ramp networks. Having constructed the ramp graph G" based on the trimmed ramp graph G' around the ramp network in step 205, the system 100 can grow/enrich the ramp graph G" to include neighboring ramp networks along Roads A and B into the full graph. For instance, the full ramp graph includes the ramp graph G" and neighboring ramp networks as shown in FIGS. 4A-4C.

The system 100 assumes that when a ramp is closed, traffic to access the destination of that ramp is detoured via a different, nearby ramp of the same or a different ramp network. This detour is expected to change the usual traffic patterns of this neighboring ramp or ramp network. For instance, if an off-ramp is closed, usually a detour is arranged to use a previous or next off-ramp of the same or a different ramp network. This detour causes an increase in the traffic of this previous or next off-ramp of the same or the different ramp network, respectively. As a result, this step enables the closure verification algorithm to monitor and identify change in driving patterns in neighboring ramps or ramp networks.

For instance, where A-West is the main road and Road B is the secondary road, the system 100 can construct the full ramp graph by extending the ramp graph G" along the main road (A-West) forwards and backwards to discover other ramp networks. FIGS. 4A-4C are diagrams illustrating examples ramp graphs, according to various embodiments. To simply the discussion, the exact off-ramp on A-West in FIG. 3A is the reported closed off-ramp R from A-west, and the system 100 runs via steps 201-205 based on the reported closed ramp R to generate the original ramp graph 401 (e.g., the ramp graph G") and sent in the center of FIG. 4A. The system 100 can then construct the full ramp graph to add a number of neighboring ramp networks (e.g., RN(2), RN(1), RN(-1), RN(-2)), using a design parameter k=2.

The system 100 can set a maximum value for k, where k neighboring ramp networks are too distant from the original ramp graph 401, to contain search time. Furthermore, a closure in the original ramp graph 401 would likely have no impact on driving patterns of such distant ramp networks.

Therefore, the system 100 can give up search for neighboring ramps after a maximum distance Dmax from the original ramp graph 401.

The motivation to expand the original ramp graph 401 to neighboring ramp networks is to see the impact of a specific ramp closure in ramps in neighboring ramp networks. In other words, for an off-ramp (or on-ramp) closure (e.g., the reported closed off-ramp R from A-west), the system 100 can discover change(s) in driving patterns in neighboring off-ramps/ramp networks or on-ramps/ramp networks, respectively. As such, when searching for neighboring off-ramps/ramp networks or on-ramps/ramp networks, if the system 100 discovers a neighboring ramp network (e.g., RN(−1), i.e., the ramp network 403 in FIG. 4B) does not have the off-ramp (or on-ramp) of interest. e.g., the reported closed off-ramp R from A-west, the system 100 skips that ramp network 403, such that the fully ramp graph includes neighboring ramp networks RN(2), RN(1), RN(−2), RN(−3). In this scenario, k is not incremented; however, the search distance is still incremented towards Dmax.

Subsequently, the system 100 can add neighboring ramp networks in the direction of Rod B using the same graph expansion logic as discussed. Note that this expansion focuses on ramps that connect to both B-South and B-North as in FIG. 4C; again, k=2. The fully ramp graph includes neighboring ramp networks RN-A(2), RN-A(1), RN-A(−1), RN-A(−2), RN-B(−2), RN-B(−1), RN-B(1), RN-B(2).

Once such full ramp graph is determined, the system 100 can automatically monitor a given set of ramp segments in the use such full ramp graph, and determine if the monitored ramp segments are open or closed to traffic. This approach is based on probe data, which is already available, such that no extra information needs to be obtained. The system 100 can correct a ramp closure report even when it is only partially wrong, as the system 100 can divide a reported ramp segment/network into smaller segments, and evaluates these segments individually. The system 100 can resolve ambiguities in totality of the ramps reported as closed. As such, the system 100 can monitor a collection of potentially closed ramps simultaneously. Therefore, the system 100 can replace manual monitoring of reported ramp closure(s) using probe data, thus reducing human error and frees up human resources for other tasks.

Figure 5:
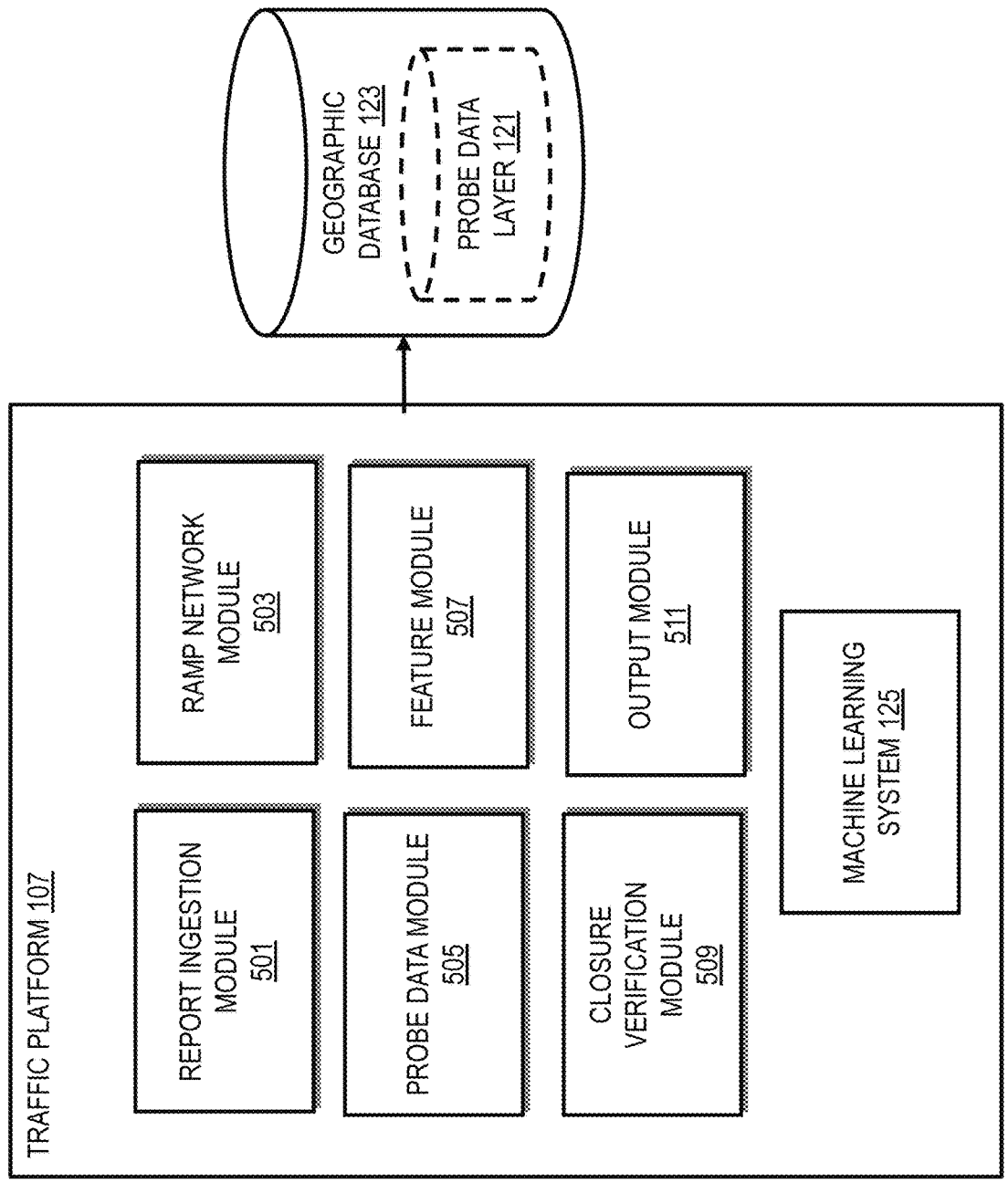
FIG. 5 is a diagram of the components of a traffic platform configured to verify reported ramp closures, according to one embodiment.

FIG. 5 is a diagram of the components of the traffic platform 107, according to one embodiment. By way of example, the traffic platform 107 includes one or more components for verifying reported ramp closures, according to the various embodiments described herein. It is contemplated that the functions of these components may be combined or performed by other components of equivalent functionality. In one embodiment, the traffic platform 107 includes a report ingesting module 501, a ramp network module 503, a probe data module 505, a feature module 507, a closure verification module 509, an output module 511, and a machine learning system 125, and has connectivity to a geographic database 123 including a probe data layer 121. The above presented modules and components of the traffic platform 107 can be implemented in hardware, firmware, software, or a combination thereof. Though depicted as a separate entity in FIG. 1, it is contemplated that the traffic platform 107 may be implemented as a module of any other component of the system 100. In another embodiment, the traffic platform 107 and/or the modules 501-511 may be implemented as a cloud-based service, local service, native application, or combination thereof. The functions of the traffic platform 107, the machine learning system 125, and/or the modules 501-511 are discussed with respect to FIGS. 6-7.

Figure 6:
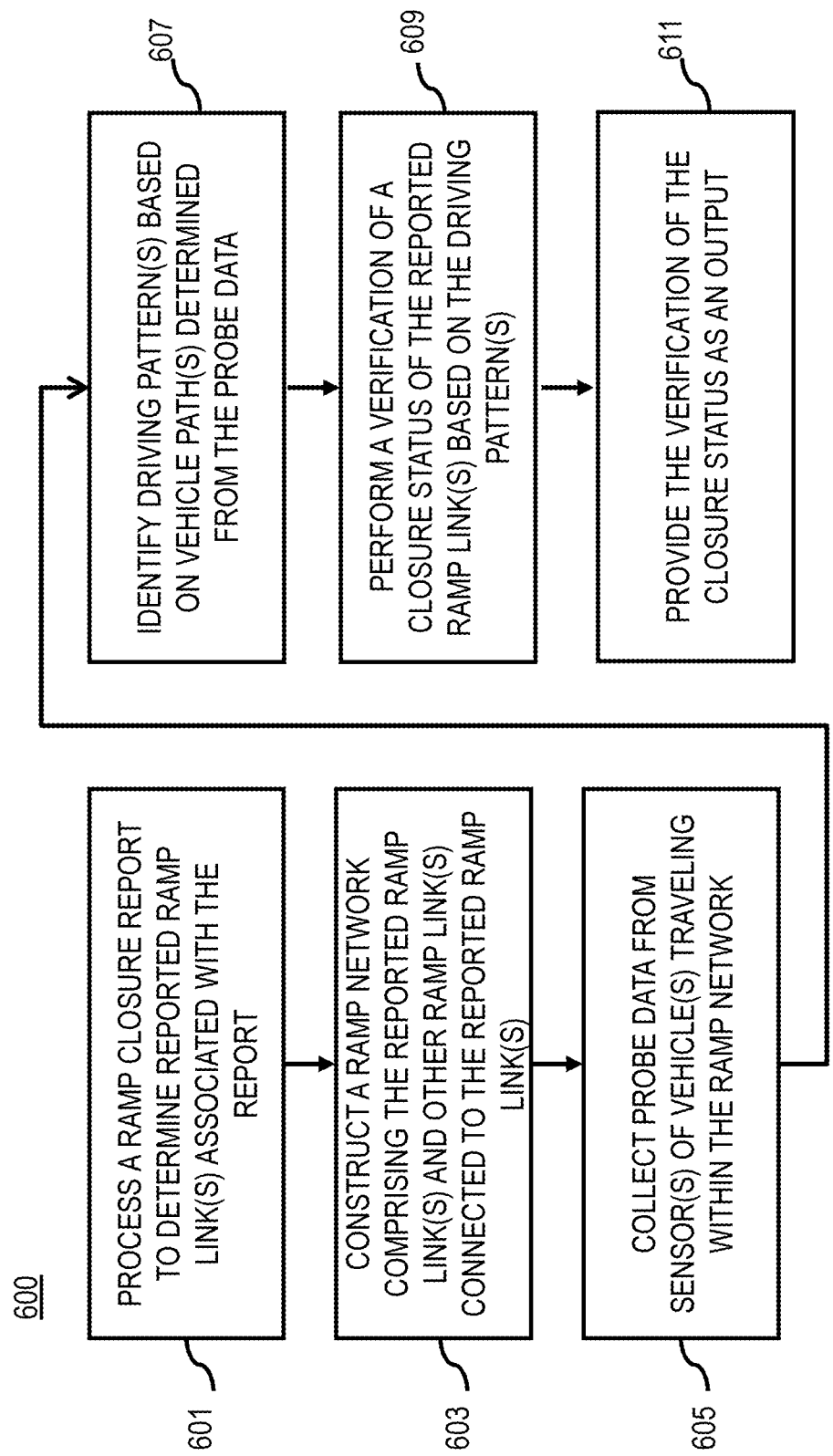
FIG. 6 is a flowchart of a process for verifying reported ramp closures, according to one embodiment.

FIG. 6 is a flowchart of a process for verifying reported ramp closures, according to one embodiment. In various embodiments, the traffic platform 107, the machine learning system 125, and/or any of the modules 501-511 may perform one or more portions of the process 600 and may be implemented in, for instance, a chip set including a processor and a memory as shown in FIG. 13. As such, the traffic platform 107, the machine learning system 125, and/or the modules 501-511 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all the illustrated steps.

In one embodiment (e.g., Step 201), for example in step 601, the report ingesting module 501 can process a ramp closure report to determine one or more reported ramp links (e.g., the on-ramp R from A-West to B-South in FIG. 2C) associated with the ramp closure report.

In one embodiment, in step 603, the ramp network module 503 can construct a ramp network (e.g., the ramp network G, the trimmed ramp network G', or the ramp graph G" in FIG. 2C) comprising the one or more reported ramp links (e.g., the on-ramp R) and one or more other ramp links (e.g., non-ramp links in FIG. 2C) connected to the one or more reported ramp links.

For instance, the constructing of the ramp network can comprise: determining one or more start links (e.g., a start link r1 in FIG. 2C) from among the one or more reported ramp links (e.g., the on-ramp R with five links r1-r5 in FIG. 2C), the one or more other ramp links (e.g., other ramp links in the on-ramp R and/or the ramp network G), or a combination thereof, and the one or more start links (e.g., the start link r1) have no incoming connections from another ramp link; and recursively growing the ramp network backwards and forwards from the one or more start links until a current link is not a ramp link (e.g., non-ramp links on Roads A and B) or there is no new ramp link.

As another instance, the constructing of the ramp network can comprise: determining one or more end links (e.g., an end link r5 in FIG. 2C) from among the one or more reported ramp links (e.g., the on-ramp R in FIG. 2C), the one or more other ramp links (e.g., other ramp links in the on-ramp R and/or the ramp network G), or a combination thereof, and the one or more end links (e.g., the end link r5) have no outgoing connections to another ramp link; and recursively growing the ramp network backwards and forwards from the one or more end links until a current link is not a ramp link (e.g., non-ramp links on Roads A and B) or there is no new ramp link.

In one embodiment (e.g., Step 203), the ramp network module 503 can perform a classification of the one or more reported ramp links as an exact on-ramp (e.g., the ramp network in FIG. 3B), an exact off-ramp (e.g., the ramp network in FIG. 3A), an ambiguous off-ramp (e.g., the ramp network in FIG. 3C), an ambiguous on-ramp (e.g., the ramp network in FIG. 3D), or an ambiguous ramp (e.g., the ramp network in FIG. 3E); and select the probe data to monitor based on the classification. In a first scenario, only the probe data from the one or more reported ramp links in the ramp network is monitored based on determining that the classification is an exact on-ramp (e.g., the ramp network in FIG.

3B) or an exact off-ramp (e.g., the ramp network in FIG. 3A). In a second scenario, none of the probe data from any on-ramp link in the ramp network is monitored based on determining that the classification is an ambiguous off-ramp (e.g., the ramp network in FIG. 3C). In a third scenario, none of the probe data from any off-ramp link in the ramp network is monitored based on determining that the classification is an ambiguous on-ramp (e.g., the ramp network in FIG. 3D). In a fourth scenario, the probe data from all ramp links in the ramp network is monitored based on determining that the classification is an ambiguous ramp (e.g., the ramp network in FIG. 3E).

In one embodiment (e.g., Step 205), the ramp network module 503 can determine one or more start links from among the one or more reported ramp links, the one or more other ramp links, or a combination thereof (e.g., of the trimmed ramp network G'), and the one or more start links have no incoming connections from another ramp link; determine one or more end links from among the one or more reported ramp links, the one or more other ramp links, or a combination thereof (e.g., of the trimmed ramp network G'), and the one or more end links have no outgoing connections to another ramp link. The ramp network module 503 can then recursively grow the ramp network backwards and forwards from the one or more start links, the one or more end links, or a combination thereof by adding only non-ramp links (e.g., of Roads A and B), until a maximum distance (e.g., from the start link) is reached, a maximum number of added links is reached, or a maximum connection complexity (e.g., of the grown structure0 is reached.

In one embodiment (e.g., Step 207), the ramp network module 503 can extend the ramp network backwards and forwards along a main road link (e.g., A-West) to at least one other ramp network (e.g., FIGS. 4A-4C).

In one embodiment, in step 605, the probe data module 505 can collect probe data collected from one or more sensors of one or more vehicles 103a-103n (also collectively referred to as vehicles 103) traveling within the ramp network. For instance, the vehicles 103 include standard vehicles, autonomous vehicles, heavily assisted driving (HAD) vehicles, semi-autonomous vehicles, etc. In one instance, the vehicles 103 include one or more vehicle sensors 105a-105n (also collectively referred to as vehicle sensors 105) (e.g., positioning sensors) and have connectivity to the traffic platform 107 via a communication network 109. In one embodiment, the sensor data includes probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In another embodiment, the probe data can be collected from one or more user equipment (UE) 111a-111n (also collectively referenced to herein as UEs 111) associated with the vehicles 103 (e.g., an embedded navigation system), a user or a passenger of a vehicle 103 (e.g., a mobile device, a smartphone, a client terminal, etc.), or a combination thereof. In one instance, the UEs 111 may include one or more applications 113a-113n (also collectively referred to herein as applications 113) (e.g., a navigation or mapping application).

In another embodiment, the probe data can be collected from one or more other sources such as government/municipality agencies, local or community agencies (e.g., police departments), and/or third-party official/semi-official sources (e.g., the services platform 115, one or more services 117a-117n, one or more content providers 119a-119m, etc.).

In one instance, the probe data collected by the vehicle sensors 105, the UEs 111, one or more other sources, or a combination thereof may be stored in the probe data layer 121 of the geographic database 123 or a combination thereof.

In one embodiment, in step 607, the feature module 507 can identify one or more driving patterns based on one or more vehicle paths determined from the probe data. For instance, the driving patterns can be attributes or features derived from the probes data of a probe (e.g., the vehicle 103, the UE 111, etc.) directly, or calculated from a group of probes. Vehicle paths constructed from multiple probes from a specific vehicle are examples of such calculated features. By way of example, a vehicle path can be derived from two consecutive map-matched vehicle probes to build up on top of the previously calculated path.

In one embodiment, a path can be calculated by (1) taking the first and second probe received, denoted as probe1 and probe2 for a specific vehicle; (2) discarding the probe1, setting probe1=probe2, and going to Step (1), when a time difference between these probes is more than a specified threshold; (3) otherwise, building a path from probe1 to probe2, using a pathing algorithm such as A*; and (4) recording the new path for the vehicle, discarding probe1, setting probe1=probe2, and go to Step (1). The system 100 can then pick the most probable path over all possible/considered candidates.

In another embodiment, Step 3 becomes more complicated, where the algorithm can keep a sequence of probes in memory, and use Hidden Markov Models (HMM) to select the most probable path over this sequence of probes. Again, the system 100 can then pick the most probable path over all possible/considered candidates.

In another embodiment, the system 100 can consider a probe sending frequency of a vehicle when deterring a path. Every vehicle can send their GPS probes at a different frequency, and this frequency can vary from one second to a few minutes. Therefore, as a vehicle drives through multiple links, there is no guarantee that the vehicle will send a probe from every link. For instance, if a vehicle drives at fast speeds over short links while sending a probe every 2 minutes, its two consecutive probes are very likely arrive from non-neighboring links. This sporadic probe reporting makes it more challenging to build accurate vehicle paths. The notion of superlinks (aggregating links and their probes where it makes sense as discussed in FIG. 2C) makes it easier to generate vehicle paths.

In one embodiment, the features can include vehicles driving through a superlink/ramp, vehicles avoiding/detouring a superlink/ramp, an increase in traffic in previous/next ramp network, a deviation of observed vehicle volumes from expected (e.g., average historical) vehicle volumes for one or more parts of the full ramp graph, actual speeds of vehicles on various parts of the full ramp graph, deviation of the actual speeds from the expected speeds, ramp complexity (e.g., using a metric to identify how deep a ramp network expands inflow/outflow links), etc. These features can be generated for each superlink/ramp periodically, e.g., every 5-minutes. These 5-minute periods are called epochs. In other words, the system 100 can listen to GPS probes (or sensor data) on the full ramp graph and generate features for each superlink/ramp as an epoch pair.

For example, the feature module 507 can process the one or more driving patterns to calculate one or more ramp network features, and the verification of the closure status can be based on the one or more ramp network features. By way of example, the one or more ramp network features can include at least one of: the one or more vehicles driving through a ramp link in the ramp network; the one or more vehicles avoiding or detouring the ramp link in the ramp network; an increase in traffic in another ramp network upstream or downstream from the ramp network; a deviation of observed vehicle volumes from an expected vehicle volume in one or more portions of the ramp network; a speed of the one or more vehicles; and a ramp complexity of the ramp network.

In one embodiment, in step 609, the closure verification module 509 can perform a verification of a closure status of the one or more reported ramp links based on the one or more driving patterns. For instance, the verification of the closure status can be rule-based, machine learning-based, or a combination thereof, and the rule-based verification can include a decision hysteresis. Once deriving such features of the step 607 are generated, the closure verification module 509 can either manually analyze them, or train a machine learning model to identify rules/patterns/functions to separate deriving behavior during presence and absence of closures.

By way of example, the machine learning system 125 can select respective factors such as transport modes, traffic patterns, road/ramp topology, driving behaviors, etc., to identify rules/patterns/functions to separate driving behaviors during presence and absence of ramp closures for different scenarios in different regions (e.g., towns, city, suburbs, mountains, countries, etc.). In one embodiment, the machine learning system 125 can train a ramp closure machine learning model to select or assign respective weights, correlations, relationships, etc. among the factors, to determine the driving pattern rules/patterns/functions for different scenarios. In one instance, the machine learning system 125 can continuously provide and/or update the ramp closure machine learning model (e.g., a support vector machine (SVM), neural network, decision tree, etc.) of the machine learning system 125 during training using, for instance, supervised deep convolution networks or equivalents. In other words, the machine learning system 125 trains the ramp closure machine learning model using the respective weights of the factors to most efficiently determine the driving pattern rules/patterns/functions for different scenarios in different regions.

In another embodiment, the machine learning system 125 of the traffic platform 107 includes a neural network or other machine learning system to compare (e.g., iteratively) vehicle paths features and/or enhanced vehicle path features (e.g., using the driving pattern rules/patterns/functions, etc.) to verify reported ramp closures. In one embodiment, the neural network of the machine learning system 125 is a traditional convolutional neural network which consists of multiple layers of collections of one or more neurons (which are configured to process a portion of an input data). In one embodiment, the machine learning system 125 also has connectivity or access over the communication network 109 to the probe data layer 121 and/or the geographic database 123 that can each store probe data, labeled or marked features (e.g., historically expected volumes and/or real-time actual observed volumes on ramp segments), etc.

In one embodiment, the machine learning system 125 can improve the reported ramp closure verification process using feedback loops based on, for example, user behavior and/or feedback data (e.g., from traffic incident specialists). In one embodiment, the machine learning system 125 can improve the ramp closure machine learning model using user behavior and/or feedback data as training data. For example, the machine learning system 125 can analyze correctly identified ramp closure data, missed ramp closure data, etc. to determine the performance of the ramp closure machine learning model.

By way of example, the system 100 can apply such rule-based ramp closure machine learning model using the features generated from probe data on a reported closure's graph in real time. By way of example, the ramp closure machine learning model can combine the features as a set of logical sentences (e.g., feature1>3 and feature2<2|feature 3=1.5 and feature4 is false). The ramp closure machine learning model can then apply labeled training data, which for each superlink-epoch pair state closed or open. The ramp closure machine learning model can further select a learner (e.g., a neural network, a support vector machine, etc.), and adjust weights of the features to minimize a loss function given the labels. Next, the ramp closure machine learning model can produce a closure probability for a given superlink. If this probability is beyond a decision threshold, the ramp closure machine learning model can determine the superlink as closed. Otherwise, the superlink is open. For instance, when the decision threshold is 0.5 (i.e., 50%), where a specific closure probability above 0.5 would indicate closure, and a value below 0.5 would indicate the superlink is open.

In another embodiment, the ramp closure machine learning model can avoid decision hysteresis when the features have ambiguous values as follows. For instance, the ramp closure machine learning model can produce a probability close to the decision threshold (e.g., 0.5). With slight change (s) to any of the features, the probability can go beyond the decision threshold, come back and exceed the decision threshold again multiple times in a short time interval. This would result in multiple back-and-forths between open and closed states. The ramp closure machine learning model can apply the following pseudo code to solve this problem using two more thresholds on top of the decision threshold, e.g., a Closure Threshold (e.g., 0.75 or 75%) and an Opening Threshold (e.g., 0.25 or 25%).

For the first time, when the ramp closure machine learning model is going to make a decision, it calculates a probability and decides on closure status by comparing this probability to the decision threshold. If probability>=the decision threshold, the state of the ramp is closed. Else the state of the ramp is open. In subsequent decisions, again the closure probability is calculated. However, this time the closure probability is compared against one of the new thresholds depending on the most recent closure state. By doing this, the decision threshold is ignored.

Specifically, when the most recent ramp closure state=closed, the ramp closure machine learning model can compare the closure probability to the Opening Threshold. When the closure probability<the Opening Threshold, the state of the ramp is open. Else, the state of the ramp remains closed. When the most recent ramp closure state=open, the ramp closure machine learning model can compare the closure probability to the Closure Threshold. When the closure probability>the Closure Threshold, the state of the ramp is closed. Else, the state of the ramp remains as open. Examples of the application of the thresholds are provided in Table 1 as follows.

TABLE 1

Decision Threshold = .5
Opening Threshold = .25
Closure Threshold = .75
@ time = t1: Initial closure probability = .52: Ramp closure state TABLE 1-continued is set to closed.
@ time = t2: Closure probability = .35: Ramp closure state remains closed as closure probability is greater than Opening Threshold.
@ time = t3: Closure probability = .22: Ramp closure state set to open as closure probability is less than Opening Threshold.
@ time = t4: Closure Probability = .67: Ramp closure state remains open as closure probability is less than Closure Threshold.
@ time = t5: Closure Probability = .80: Ramp closure state set to closed as closure probability is greater than Closure Threshold.

In one embodiment, in step 611, the output module 511 can provide the verification of the closure status as an output. For instance, the output module 511 can provide the verified ramp closure data to the services platform 115 that provides, for example, mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc.

Figure 7A:
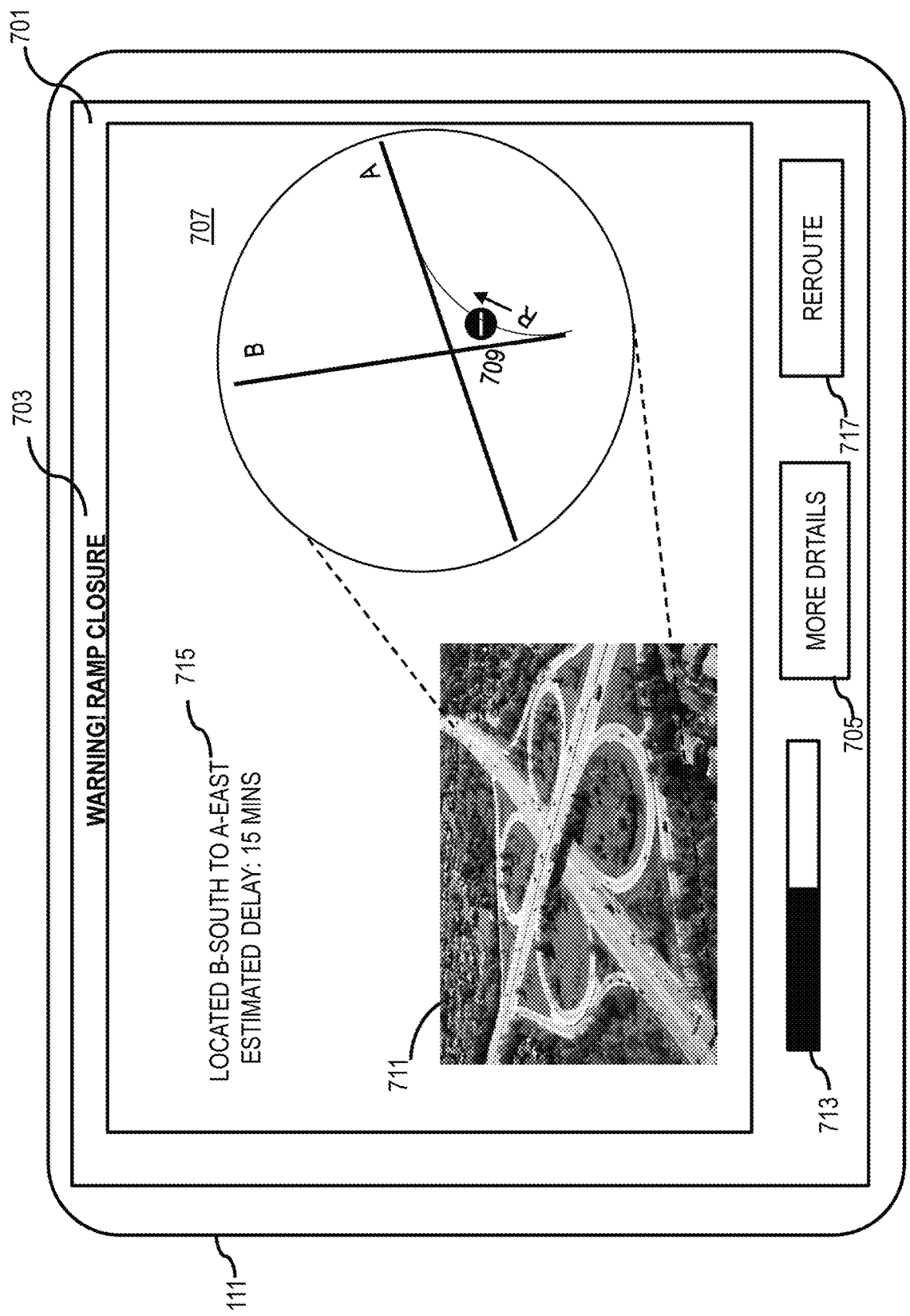
FIGS. 7A-7B are diagrams of example user interfaces of managing verified ramp closures, according to various embodiments.
Figure 7B:
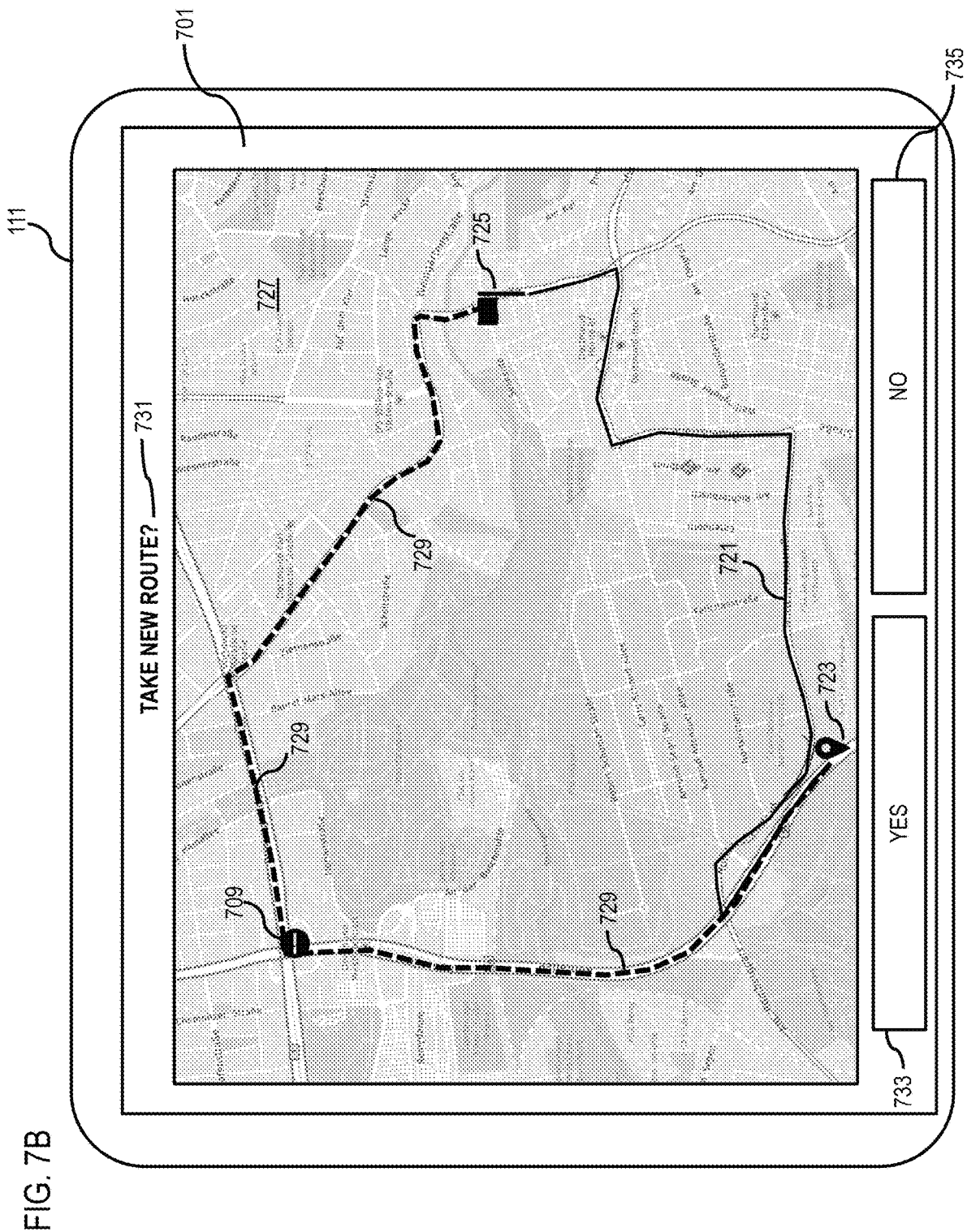

FIGS. 7A-7B are diagrams of example user interfaces of managing verified ramp closures, according to various embodiments. In FIG. 7A, a user interface (UI) 701 (e.g., a navigation application 113) is generated for a UE 111 (e.g., a mobile device, an embedded navigation system, a client terminal, etc.) that shows an alert 703: "Warning! Ramp Closure." When a user (e.g., a driver, a traffic controller, a fleet dispatcher, a traffic data provider staff, etc.) selects an input 705 of "More Details", the UI 701 depicts an enlarged view 707 that enables the user to view a verified ramp closure 709 on a ramp network 711 within a monitored area during and/or after reported ramp closures in the area were automatically verified based on the above-described embodiments. The UI 701 can also shows a zoom-in slider 713 for the user to adjust a zoom-in level of the enlarged view 707. The UI 701 can further shows additional information 715 of the verified ramp closure, such as "located B-South to A-East, and estimated delay: 15 mins." The UI 701 can further shows an additional input 717 of "Reroute."

In FIG. 7B, after receiving a user selection of the input 717 of "Reroute," the system 100 can generate a new navigation route 721 between a starting point 723 and a desired destination 725 on a digital map 727, that bypasses the verified ramp closure 709 on the first route 729. In one embodiment, the UI shows an alert 731: "Take new route?," an input 733 of "Yes", and an input 735 of "No," for the user to select. For example, when the user selects the input 733 of "Yes", the system 100 can generate navigation instructions for the user and/or the vehicle 103 to execute.

In one embodiment, the output module 511 can provide the verified ramp closure data to the machine learning system 125 thereby improving automatic closure verification (ACV) decision accuracy. In particular, the above-discussed embodiments can be apply to various ramp networks/structures to verify reported ramp closure(s) thereon, without making any changes on the existing ramp closure reporting implementation. The above-discussed embodiments provide ramp automatic closure verification by processing probe data on a given ramp network, extracting driving pattern attributes directly correlated to a closure state of the ramp network, and accurately reporting the start and end of a ramp closure in terms of time and space.

Returning to FIG. 1, in one embodiment, the traffic platform 107 performs the process for verifying reported ramp closures as discussed with respect to the various embodiments described herein. For example, the traffic platform 107 can generate vehicle path related features and ramp closure related features for machine learning solutions (e.g., ACV).

In one embodiment, the traffic platform 107 has connectivity over the communications network 109 to the services platform 115 (e.g., an OEM platform) that provides the services 117 (e.g., probe and/or sensor data collection services). By way of example, the services 117 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g. whether a ramp segment is closed or not) of the traffic platform 107 to provide services such as navigation, mapping, other location-based services, etc.

In one embodiment, the traffic platform 107 may be a platform with multiple interconnected components. The traffic platform 107 may include multiple servers, intelligent networking devices, computing devices, components, and corresponding software for providing parametric representations of lane lines. In addition, it is noted that the traffic platform 107 may be a separate entity of the system 100, a part of the services platform 115, a part of the one or more services 117, or included within a vehicle 103 (e.g., an embedded navigation system).

In one embodiment, content providers 119 may provide content or data (e.g., including road closure reports, ramp closure reports, probe data, expected vehicle volume data, etc.) to the traffic platform 107, the UEs 111, the applications 113, the services platform 115, the services 117, the probe data layer 121, the geographic database 123, and the vehicles 103. The content provided may be any type of content, such as map content, textual content, audio content, video content, image content, etc. In one embodiment, the content providers 119 may provide content regarding the expected frequency of vehicles 103 on the digital map or link as well as content that may aid in localizing a vehicle path or trajectory on a digital map or link (e.g., to assist with determining actual vehicle volumes on a ramp segment, a ramp network, a road network, etc.). In one embodiment, the content providers 119 may also store content associated with the traffic platform 107, the services platform 115, the services 117, the probe data layer 121, the geographic database 123, and/or the vehicles 103. In another embodiment, the content providers 119 may manage access to a central repository of data, and offer a consistent, standard interface to data, such as a repository of the probe data layer 121 and/or the geographic database 123.

By way of example, the UEs 111 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 11I can support any type of interface to the user (such as "wearable" circuitry, etc.). In one embodiment, a UE 111 may be associated with a vehicle 103 (e.g., a mobile device) or be a component part of the vehicle 103 (e.g., an embedded navigation system). In one embodiment, the UEs 111 may include the traffic platform 107 to verify reported ramp closures.

In one embodiment, as mentioned above, the vehicles 103, for instance, are part of a probe-based system for collecting probe data for detecting actual and expected vehicle volumes on a road network and/or measuring traffic conditions in a road network (e.g., free flow traffic versus a road closure). In one embodiment, each vehicle 103 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103 may include vehicle sensors 105 for reporting measuring and/or reporting attributes. The attributes can also be any attribute normally collected by an on-board diagnostic (OBD) system of the vehicle 103, and available through an interface to the OBD system (e.g., OBD II interface or other similar interface).

The probe points can be reported from the vehicles 103 in real-time, in batches, continuously, or at any other frequency requested by the system 100 over, for instance, the communication network 109 for processing by the traffic platform 107. The probe points also can be map matched to specific road links stored in the geographic database 123. In one embodiment, the system 100 (e.g., via the traffic platform 107) generates vehicle paths or trajectories from the observed and expected frequency of probe points for an individual probe as discussed with respect to the various embodiments described herein so that the probe traces represent a travel trajectory or vehicle path of the probe through the road network.

In one embodiment, as previously stated, the vehicles 103 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the probe data layer 121) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like.

Though depicted as automobiles, it is contemplated the vehicles 103 can be any type of vehicle manned or unmanned (e.g., cars, trucks, buses, vans, motorcycles, scooters, drones, etc.) that travels through road segments of a road network.

Other examples of sensors 105 of a vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 103 along a path of travel, moisture sensors, pressure sensors, etc. In a further example embodiment, vehicle sensors 105 about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 103 may include GPS or other satellite-based receivers to obtain geographic coordinates from satellites 127 for determining current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring and/or generating probe data and/or sensor data associated with a vehicle 103, a driver, a passenger, other vehicles, conditions regarding the driving environment or roadway, etc. For example, such sensors may be used as GPS receivers for interacting with the one or more satellites 127 to determine and track the current speed, position, and location of a vehicle 103 travelling along a link or road segment. In addition, the sensors may gather tilt data (e.g., a degree of incline or decline of the vehicle during travel), motion data, light data, sound data, image data, weather data, temporal data and other data associated with the vehicles 103 and/or UEs 111. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 109 as probe data (e.g., GPS probe data) according to any known wireless communication protocols. For example, each UE 111, application 113, user, and/or vehicle 103 may be assigned a unique probe identifier (probe ID) for use in reporting or transmitting the probe data collected by the vehicles 103 and/or UEs 111. In one embodiment, each vehicle 103 and/or UE 111 is configured to report probe data as probe points, which are individual data records collected at a point in time that records telemetry data.

In one embodiment, the traffic platform 107 retrieves aggregated probe points gathered and/or generated by the vehicle sensors 105 and/or the UEs 111 resulting from the travel of the UEs 111 and/or vehicles 103 on a road segment of a road network. In one instance, the probe data layer 121 stores a plurality of probe points and/or trajectories generated by different vehicle sensors 105, UEs 111, applications 113, vehicles 103, etc. over a period while traveling in a large, monitored area (e.g., a stretch of roadway where a closure incident is reported). A time sequence of probe points specifies a trajectory—i.e., a path traversed by a UE 111, application 113, vehicle 103, etc. over the period. In one instance, as the time between data points increases, so does the distance and the possible routes/paths between those two points.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle sensors 105, traffic platform 107, UEs 111, applications 113, services platform 115, services 117, content providers 119, and/or satellites 127 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
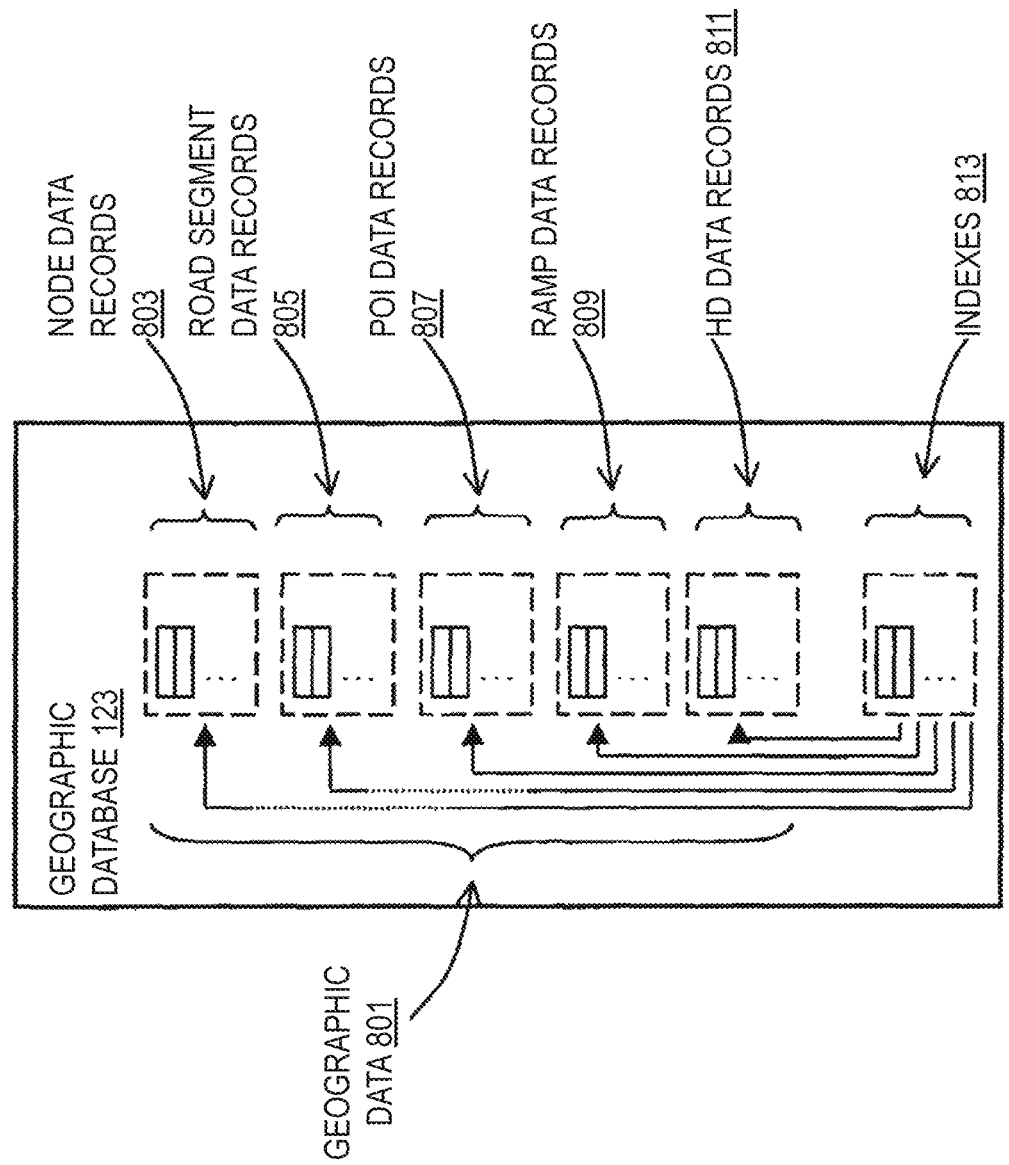
FIG. 8 is a diagram of a geographic database, according to one embodiment.

FIG. 8 is a diagram of a geographic database (such as the database 123), according to one embodiment. In one embodiment, the geographic database 111 includes geographic data 801 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 811) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 803, road segment or link data records 805, POI data records 807, ramp data records 809, mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 123. In one embodiment, the indexes 813 may be used to quickly locate data without having to search every row in the geographic database 123 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points (such as intersections) corresponding to the respective links or segments of the road segment data records 805. The road link data records 805 and the node data records 803 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 807. The geographic database 123 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city). In one embodiment, certain attributes, such as lane marking data records, mapping data records and/or other attributes can be features or layers associated with the link-node structure of the database.

In one embodiment, the geographic database 123 can also include ramp data records 809 for storing ramp network data, ramp graph data, ramp driving pattern data, ramp closure machine learning model data, training data, prediction models, annotated observations, computed featured distributions, sampling probabilities, and/or any other data generated or used by the system 100 according to the various embodiments described herein. By way of example, the ramp data records 809 can be associated with one or more of the node records 803, road segment records 805, and/or POI data records 807 to support localization or visual odometry based on the features stored therein and the corresponding estimated quality of the features. In this way, the ramp data records 809 can also be associated with or used to classify the characteristics or metadata of the corresponding records 803, 805, and/or 807.

In one embodiment, as discussed above, the mapping data records 811 model road surfaces and other map features to centimeter-level or better accuracy. The mapping data records 811 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 811 are divided into spatial partitions of varying sizes to provide mapping data to vehicles 103 and other end user devices with near real-time speed without overloading the available resources of the vehicles 103 and/or devices (e.g., computational, memory, bandwidth, etc. resources).

In one embodiment, the mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 811.

In one embodiment, the mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 119 in association with the services platform 117 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 103 and/or UEs 111) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for verifying reported ramp closures may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
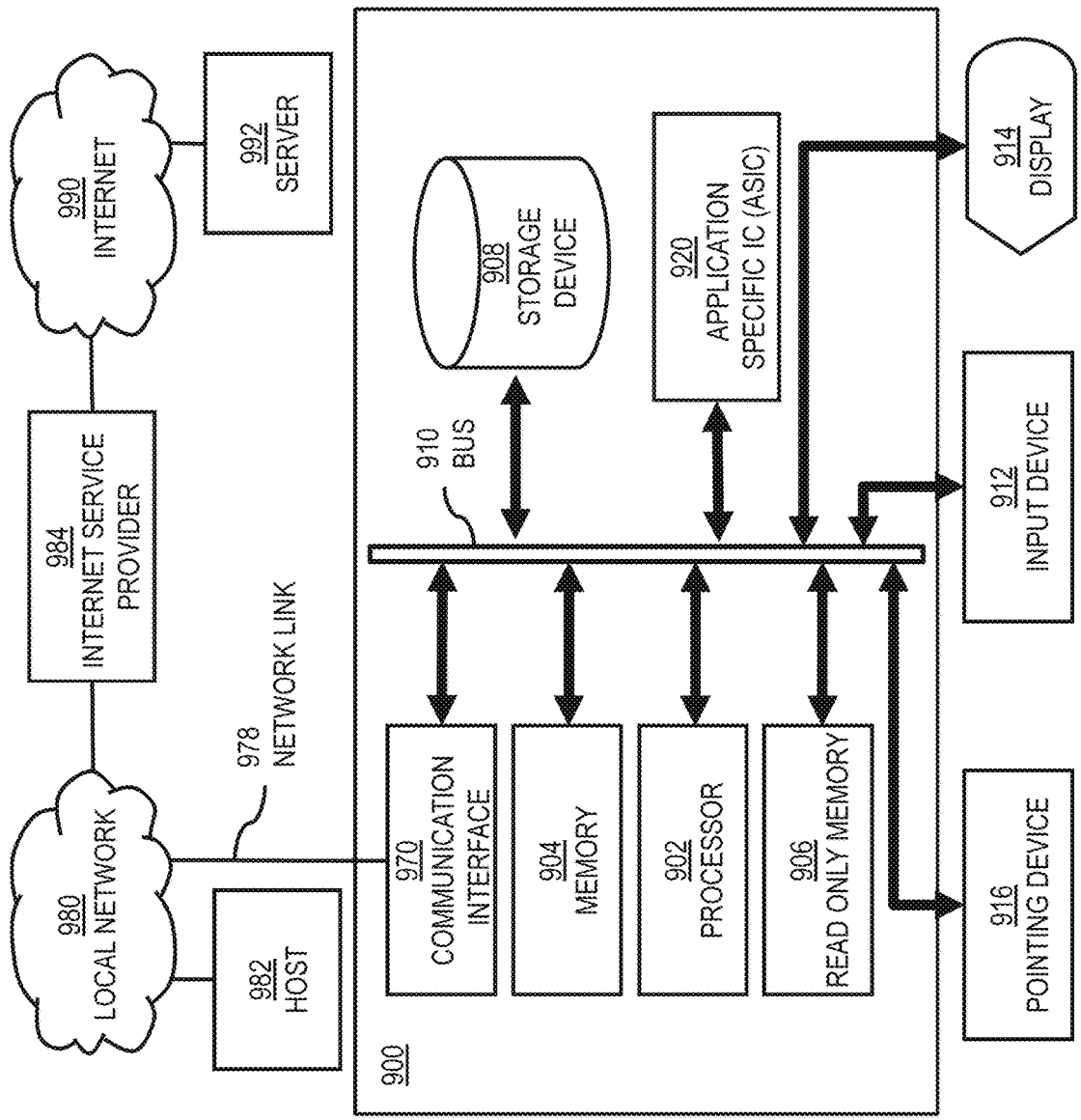
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to verify reported ramp closures as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to verifying reported ramp closures. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for verifying reported ramp closures. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, which is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, which persists even when the computer system 900 is turned off or otherwise loses power.

Information, including instructions for verifying reported ramp closures, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, which carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for verifying reported ramp closures.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

Figure 10:
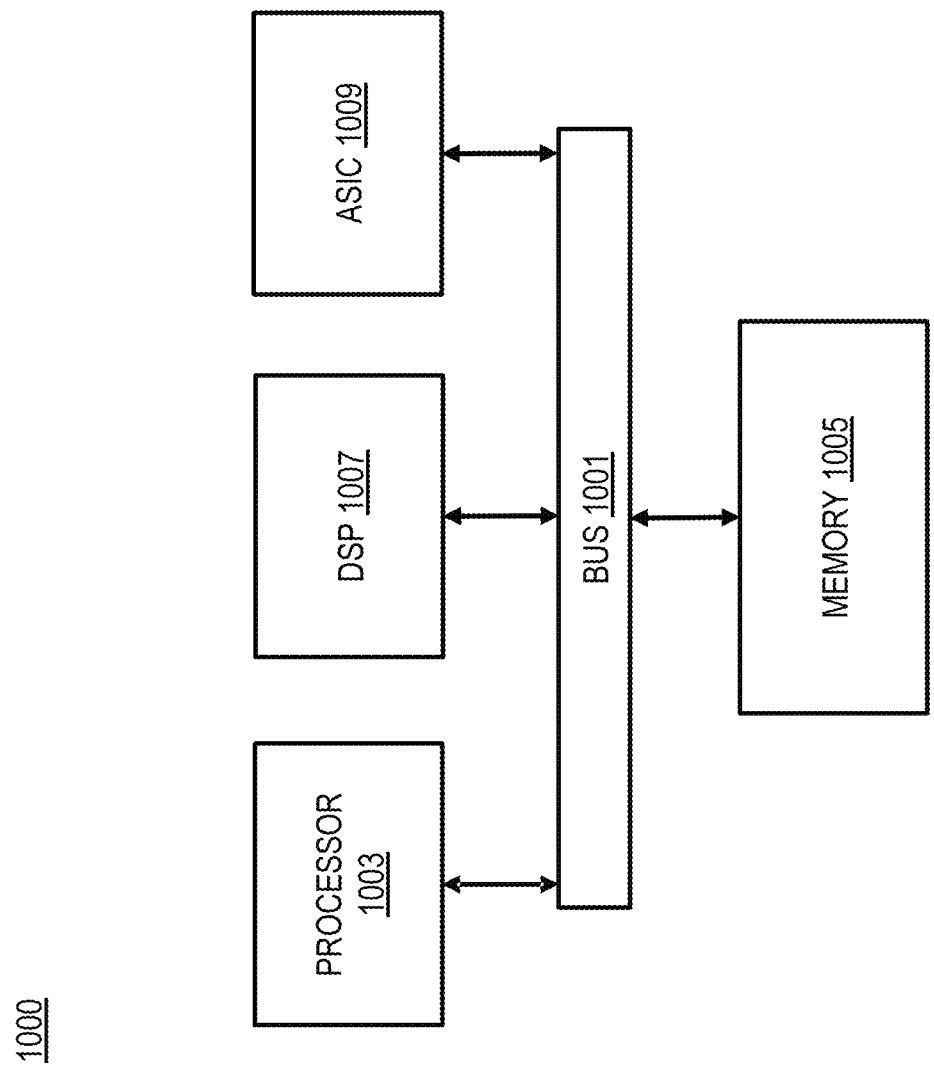
FIG. 10 is a diagram of a chip set that can be used to implement an embodiment.

FIG. 10 illustrates a chip set 1000 upon which an embodiment of the invention may be implemented. Chip set 1000 is programmed to verify reported ramp closures as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to verify reported ramp closures. The memory 1005 also stores the data associated with or generated by the execution of the inventive steps.

Figure 11:
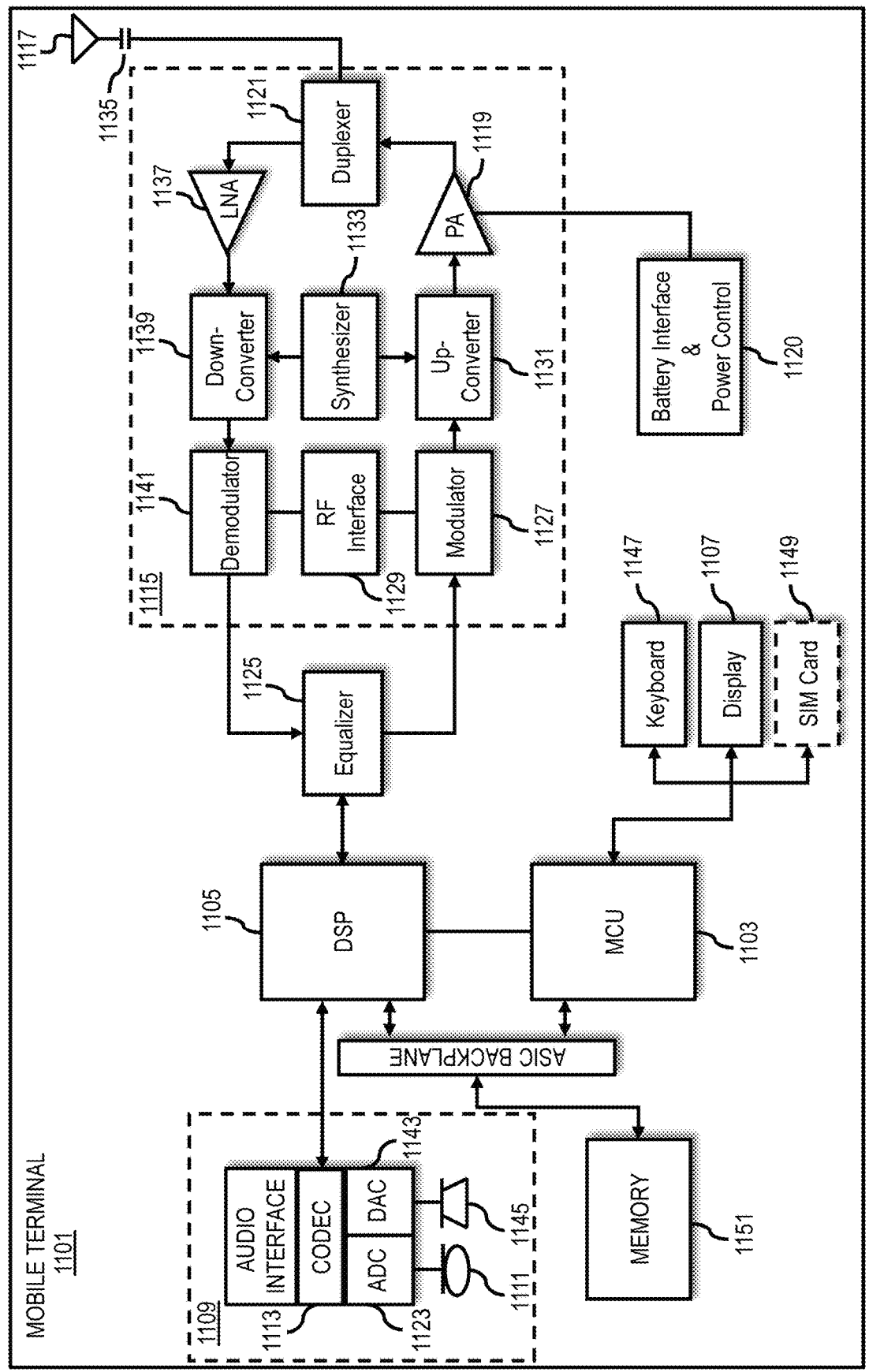
FIG. 11 is a diagram of a mobile terminal (e.g., handset or vehicle or part thereof) that can be used to implement an embodiment.

FIG. 11 is a diagram of exemplary components of a mobile terminal 1101 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to verify reported ramp closures. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing a ramp closure report to determine one or more reported ramp links associated with the ramp closure report;
   constructing a ramp network comprising the one or more reported ramp links and one or more other ramp links connected to the one or more reported ramp links;

collecting probe data collected from one or more sensors of one or more vehicles traveling within the ramp network;

identifying one or more driving patterns based on one or more vehicle paths determined from the probe data;

performing a verification of a closure status of the one or more reported ramp links based on the one or more driving patterns; and providing the verification of the closure status as an output.

2. The method of claim 1, further comprising:

processing the one or more driving patterns to calculate one or more ramp network features, wherein the verification of the closure status is based on the one or more ramp network features.

3. The method of claim 2, wherein the one or more ramp network features include at least one of:

the one or more vehicles driving through a ramp link in the ramp network;

the one or more vehicles avoiding or detouring the ramp link in the ramp network;

an increase in traffic in another ramp network upstream or downstream from the ramp network;

a deviation of observed vehicle volumes from an expected vehicle volume in one or more portions of the ramp network;

a speed of the one or more vehicles; and a ramp complexity of the ramp network.

4. The method of claim 1, wherein the verification of the closure status is rule-based, machine learning-based, or a combination thereof, and wherein the rule-based verification includes a decision hysteresis.

5. The method of claim 1, wherein the constructing of the ramp network comprises:

determining one or more start links from among the one or more reported ramp links, the one or more other ramp links, or a combination thereof, wherein the one or more start links have no incoming connections from another ramp link; and recursively growing the ramp network backwards and forwards from the one or more start links until a current link is not a ramp link or there is no new ramp link.

6. The method of claim 1, wherein the constructing of the ramp network comprises:

determining one or more end links from among the one or more reported ramp links, the one or more other ramp links, or a combination thereof, wherein the one or more end links have no outgoing connections to another ramp link; and recursively growing the ramp network backwards and forwards from the one or more end links until a current link is not a ramp link or there is no new ramp link.

7. The method of claim 1, further comprising:

performing a classification of the one or more reported ramp links as an exact on-ramp, an exact off-ramp, an ambiguous off-ramp, an ambiguous on-ramp, or an ambiguous ramp; and selecting the probe data to monitor based on the classification.

8. The method of claim 7, wherein only the probe data from the one or more reported ramp links in the ramp network is monitored based on determining that the classification is an exact on-ramp or an exact off-ramp.

9. The method of claim 7, wherein none of the probe data from any on-ramp link in the ramp network is monitored based on determining that the classification is an ambiguous off-ramp.

10. The method of claim 7, wherein none of the probe data from any off-ramp link in the ramp network is monitored based on determining that the classification is an ambiguous on-ramp.

11. The method of claim 7, wherein the probe data from all ramp links in the ramp network is monitored based on determining that the classification is an ambiguous ramp.

12. The method of claim 1, further comprising:

determining one or more start links from among the one or more reported ramp links, the one or more other ramp links, or a combination thereof, wherein the one or more start links have no incoming connections from another ramp link;

determining one or more end links from among the one or more reported ramp links, the one or more other ramp links, or a combination thereof, wherein the one or more end links have no outgoing connections to another ramp link;

recursively growing the ramp network backwards and forwards from the one or more start links, the one or more end links, or a combination thereof by adding only non-ramp links, until a maximum distance is reached, a maximum number of links is reached, or a maximum connection complexity is reached.

13. The method of claim 1, further comprising:

extending the ramp network backwards and forwards along a main road link to at least one other ramp network.

14. An apparatus comprising:

at least one processor; and at least one memory including computer program code for one or more programs, the at least one memory and the computer program code configured to, with the at least one processor, cause the apparatus to perform at least the following, process a ramp closure report to determine one or more reported ramp links associated with the ramp closure report;

construct a ramp network comprising the one or more reported ramp links and one or more other ramp links connected to the one or more reported ramp links;

collect probe data collected from one or more sensors of one or more vehicles traveling within the ramp network;

identify one or more driving patterns based on one or more vehicle paths determined from the probe data;

perform a verification of a closure status of the one or more reported ramp links based on the one or more driving patterns; and provide the verification of the closure status as an output.

15. The apparatus of claim 14, wherein the apparatus is further caused to:

process the one or more driving patterns to calculate one or more ramp network features, wherein the verification of the closure status is based on the one or more ramp network features.

16. The apparatus of claim 15, wherein the one or more ramp network features include at least one of:

the one or more vehicles driving through a ramp link in the ramp network;

the one or more vehicles avoiding or detouring the ramp link in the ramp network;

an increase in traffic in another ramp network upstream or downstream from the ramp network;

a deviation of observed vehicle volumes from an expected vehicle volume in one or more portions of the ramp network;

a speed of the one or more vehicles; and a ramp complexity of the ramp network.

17. The apparatus of claim 14, wherein the verification of the closure status is rule-based, machine learning-based, or a combination thereof, and wherein the rule-based verification includes a decision hysteresis.

18. A non-transitory computer-readable storage medium carrying one or more sequences of one or more instructions which, when executed by one or more processors, cause an apparatus to perform:

processing a ramp closure report to determine one or more reported ramp links associated with the ramp closure report;

constructing a ramp network comprising the one or more reported ramp links and one or more other ramp links connected to the one or more reported ramp links;

collecting probe data collected from one or more sensors of one or more vehicles traveling within the ramp network;

identifying one or more driving patterns based on one or more vehicle paths determined from the probe data;

performing a verification of a closure status of the one or more reported ramp links based on the one or more driving patterns; and providing the verification of the closure status as an output.

19. The non-transitory computer-readable storage medium of claim 18, wherein the apparatus is caused to further perform:

processing the one or more driving patterns to calculate one or more ramp network features, wherein the verification of the closure status is based on the one or more ramp network features.

20. The non-transitory computer-readable storage medium of claim 19, wherein the one or more ramp network features include at least one of:

the one or more vehicles driving through a ramp link in the ramp network;

the one or more vehicles avoiding or detouring the ramp link in the ramp network;

an increase in traffic in another ramp network upstream or downstream from the ramp network;

a deviation of observed vehicle volumes from an expected vehicle volume in one or more portions of the ramp network;

a speed of the one or more vehicles; and a ramp complexity of the ramp network.

* * * * *